(12) United States Patent
Stratton et al.

(10) Patent No.: US 10,449,801 B2
(45) Date of Patent: *Oct. 22, 2019

(54) PARTIAL WHEEL CLADDING

(71) Applicant: Lacks Enterprises, Inc., Grand Rapids, MI (US)

(72) Inventors: Jim Stratton, Kentwood, MI (US); Brian Lutt, New Baltimore, MI (US); Brian Wrase, Ada, MI (US); Kevin Chinavare, Middleville, MI (US); Mark Nowicki, Rockford, MI (US)

(73) Assignee: Lacks Enterprises, Inc., Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/028,823

(22) Filed: Jul. 6, 2018

(65) Prior Publication Data

US 2018/0312000 A1 Nov. 1, 2018

Related U.S. Application Data

(63) Continuation of application No. 15/460,782, filed on Mar. 16, 2017, now Pat. No. 10,052,909, which is a
(Continued)

(51) Int. Cl.
*B60B 7/00* (2006.01)
*B60B 7/18* (2006.01)
(Continued)

(52) U.S. Cl.
CPC ............. *B60B 7/18* (2013.01); *B60B 3/10* (2013.01); *B60B 7/0066* (2013.01); *B60B 7/06* (2013.01);
(Continued)

(58) Field of Classification Search
CPC .... B60B 7/18; B60B 1/08; B60B 7/04; B60B 7/08; B60B 7/06
See application file for complete search history.

(56) References Cited

U.S. PATENT DOCUMENTS

| 6,672,676 B2 * | 1/2004 | Zaniboni | B60B 7/0013 301/37.101 |
| 7,044,524 B2 * | 5/2006 | Luetze | B60J 11/06 293/128 |

(Continued)

*Primary Examiner* — Hau V Phan
(74) *Attorney, Agent, or Firm* — John S. Artz; Dickinson Wright PLLC

(57) ABSTRACT

A wheel assembly including a cover portion permanently attached to a wheel. The wheel includes a wheel central hub portion, a wheel outer peripheral rim portion, a plurality of wheel spoke portions extending between the wheel central hub portion and the wheel outer peripheral rim portion, and a plurality of wheel turbine openings disposed between adjacent ones of the plurality of wheel spoke portions. A cover portion is configured to overlie a portion of the wheel portion. The cover portion is configured to overlie one or more of the wheel central hub portion; the plurality of wheel spoke portions, and the plurality of turbine openings or the wheel outer periphery. An adhesive is disposed between an outboard surface of the wheel and the inboard surface of the cover portion to permanently secure the cover portion to the wheel portion. When the cover portion is secured to the wheel, substantial portions of the plurality of wheel spokes, the wheel central hub, or wheel outer periphery remain exposed.

25 Claims, 28 Drawing Sheets

Related U.S. Application Data continuation of application No. 14/216,092, filed on Mar. 17, 2014, now Pat. No. 9,707,800.

(60) Provisional application No. 61/798,486, filed on Mar. 15, 2013.

(51) Int. Cl.
  *B60B 7/06* (2006.01)
  *B60B 7/08* (2006.01)
  *B60B 3/10* (2006.01)
  *B60B 27/06* (2006.01)

(52) U.S. Cl.
  CPC .............. *B60B 7/061* (2013.01); *B60B 7/065* (2013.01); *B60B 7/08* (2013.01); *B60B 27/065* (2013.01); *B60B 2900/111* (2013.01); *B60B 2900/1216* (2013.01); *B60B 2900/572* (2013.01); *Y02T 10/88* (2013.01); *Y10T 29/49492* (2015.01)

(56) References Cited

U.S. PATENT DOCUMENTS

| | | | | |
|---|---|---|---|---|
| 7,416,260 | B1* | 8/2008 | Cuevas | B60B 7/08 301/37.106 |
| 7,448,695 | B1* | 11/2008 | Wolf | B60B 7/004 301/37.31 |
| 7,758,131 | B1* | 7/2010 | Wolf | B60B 3/044 301/37.102 |
| 7,891,744 | B2* | 2/2011 | Yee | B60B 7/004 301/37.11 |
| 8,162,406 | B2* | 4/2012 | Heck | B60B 7/04 301/37.43 |
| 8,382,211 | B2* | 2/2013 | Renius | B60B 7/065 301/37.102 |
| 9,707,800 | B2* | 7/2017 | Stratton | B60B 7/18 |
| 10,052,909 | B2* | 8/2018 | Stratton | B60B 7/18 |
| 2003/0038529 | A1* | 2/2003 | Hsu | B60B 3/16 301/37.371 |
| 2003/0047987 | A1* | 3/2003 | Enomoto | B60B 1/08 301/37.101 |
| 2007/0157470 | A1* | 7/2007 | Murray | B60B 7/0053 29/894.3 |

* cited by examiner

PARTIAL WHEEL CLADDING

CROSS-REFERENCE TO RELATED APPLICATIONS

This continuation application claims priority to U.S. patent application Ser. No. 15/460,782, filed Mar. 16, 2017, which is a continuation of U.S. patent application Ser. No. 14/216,092, filed Mar. 17, 2014, which claims priority to U.S. Provisional Patent Application Ser. No. 61/798,486, filed Mar. 15, 2013 and entitled "Partial Wheel Cladding", which are all hereby incorporated by reference as though set forth fully herein.

TECHNICAL FIELD

The present disclosure relates generally to a cladding for permanent attachment to a vehicle wheel. More particularly, the present disclosure relates to a cladding for permanent attachment to a vehicle wheel that leaves portions of the underlying wheel exposed for aesthetic purposes as well as to reduce wheel weight and improve wheel and vehicle aerodynamics.

BACKGROUND OF THE INVENTION

With recent efforts directed toward energy conservation along with the continuing escalation of fuel prices, the automotive industry has put an emphasis on increasing the fuel economy of vehicles that are put onto the road. Efforts to improve the fuel economy of vehicles have resided in improving the operation and efficiency of their engines, reducing the weight of their bodies and chassis, and improving the aerodynamic characteristics of their bodies. While great strides have been made in enhancing vehicle fuel economy as a result of improvements in these areas, there is still significant room for further advancement.

The impact of the wheels and their effect on vehicle aerodynamics as well as on vehicle fuel economy has been largely unappreciated. While there have been efforts to design and manufacture lighter weight wheels, such as through the removal of material from the spokes or the backsides of the wheel, the primary driver of these efforts has generally been cost considerations and not aerodynamics or fuel economy.

More recently, the potential aerodynamic impact of vehicle wheels themselves has been considered. These considerations have, however, largely ignored the fact that most wheel assemblies today employ covers or other structures over the wheel outboard surface that are designed to enhance the aesthetics of the wheel. Any aerodynamic benefit that may result from the design of the wheel alone is not maximized when a wheel cover or other aesthetic feature is secured to the outboard surface of the wheel that does not take into account the aerodynamics of the overall wheel assembly. Also, these claddings have been constructed to cover the entirety of the wheel exterior surface. This is done primarily for two main reasons. First, the aesthetic goal has been for a cladding to appear as an integral part of a wheel and having the cladding cover the entire wheel front surface has served that purpose. Second, vehicle wheel exterior surfaces are relatively unattractive from an aesthetic standpoint and it is thus desirable to cover the entirety of the wheel surface with the cladding. However, employing a full face cladding requires the use of additional material, which increases the total cost of the wheel assembly.

Additionally, attempts have been made to provide improved wheel aesthetics by attaching mechanical inserts to the wheel. These are generally undesirable as the attachment process can be labor intensive and expensive. Additionally, the inserts also have durability issues as can become easily detached from the wheel. Moreover, these attachments typically are configured as multiple different components that much each be separately attached to the wheel. Another attempt to improve wheel aesthetics involves painting the outboard wheel surface. Again, this process has limitations as it can be expensive and labor intensive.

Further, some vehicle wheels are configured such that any wheel cover or other aesthetic attachment would intrude upon curbside space, which would result in the wheel cover being bumped or damaged as a vehicle is being driven or parked.

It would thus be desirable to provide a wheel assembly that provides both improved aesthetics and improved wheel (and vehicle) aerodynamics.

SUMMARY OF THE INVENTION

It is therefore an aspect of the present disclosure to provide a wheel assembly including a decorative wheel cladding that covers only a portion of an exterior front surface of a wheel.

It is another aspect of the present disclosure to provide a wheel assembly including a decorative wheel cladding, which is also constructed of lighter weight.

It is still another aspect of the present disclosure to provide a wheel assembly including a decorative wheel cladding, which employs an aerodynamically efficient shape.

It is still a further aspect of the present disclosure to provide a wheel assembly including a wheel and a permanently attached decorative cladding that can result in improved vehicle energy usage.

It is a further aspect of the present disclosure to provide a wheel assembly including a decorative wheel cladding that could be less expensive than prior claddings.

It is yet another aspect of the present disclosure to provide a wheel assembly that provides improved aesthetics.

It is still a further aspect of the present disclosure to provide a wheel assembly with a cladding that yields package savings over prior wheel assemblies.

In accordance with the above and other aspects of the present disclosure, a wheel assembly is provided, which includes a decorative multi-finish wheel surface. The decorative multi-finish wheel surface can result from a metal plated cladding structure, which is permanently attached to an exterior surface of the backbone wheel such that it covers less than the entirely of front face of the backbone wheel, so that a portion of the backbone wheel front surface remains visible after the cladding is attached thereto. In accordance with another aspect, the wheel front face can be constructed with varying geometry that improves vehicle energy through an aerodynamically efficient design without sacrificing desirable aesthetics.

In accordance with the above and other aspects of the present disclosure, a wheel assembly is provided having a wheel portion including, a wheel central hub portion, a wheel outer periphery, and a plurality of wheel spoke portions extending between the wheel central hub portion and the wheel outer periphery. A plurality of wheel turbine openings extend between adjacent wheel spoke portions, the wheel central hub portion, and the wheel outer periphery. A plurality of cladding turbine opening portions are permanently attached to the wheel outer periphery and substantially surround the wheel turbine openings.

In accordance with the above and other aspects of the present disclosure, a wheel assembly is provided having a wheel portion including, a wheel central hub portion and a plurality of wheel spoke portions extending outwardly from the wheel central hub portion. The plurality of wheel spoke portions have inner ends adjacent the wheel central hub portion, outer ends disposed outwardly from the inner ends, and side surfaces extending between the inner and outer ends. A plurality of wheel turbine openings extend between adjacent ones of the plurality of wheel spoke portions. A wheel outer periphery extends adjacent the outer ends of the plurality of wheel spoke portions. The wheel central hub portion, the plurality of wheel spoke portions and the wheel outer periphery providing a wheel outboard surface. A plurality of claddings each have an inboard surface configured to overlie at least a portion of the side surfaces of the plurality of wheel spoke portions. An adhesive permanently secures the inboard surfaces of the plurality of claddings to the side surfaces of the plurality of wheel spoke portions.

In accordance with the above and other aspects of the present disclosure, a wheel assembly is provided having a wheel portion including, a wheel central hub portion, a wheel outer periphery, and a plurality of wheel spoke portions extending between the wheel central hub portion and the wheel outer periphery. A plurality of wheel turbine openings are provided, with each of the wheel turbine openings being bounded by adjacent wheel spoke portions, the wheel central hub portion, and the wheel outer periphery. A plurality of claddings are provided, with each of the claddings being permanently secured at least partially about separate ones of the plurality of wheel turbine openings.

BRIEF DESCRIPTION OF THE DRAWINGS

Other aspects of the present disclosure will be readily appreciated, as the same becomes better understood by reference to the following detailed description when considered in connection with the accompanying drawings wherein:

FIG. 1b is a perspective view of the wheel assembly of FIG. 1a;

FIG. 1c is a cross-sectional view of the wheel assembly of FIG. 1a;

FIG. 2b is a perspective view of the wheel assembly of FIG. 2a;

FIG. 2c is a cross-sectional view of the wheel assembly of FIG. 2a;

FIG. 3b is a perspective view of the wheel assembly of FIG. 3a;

FIG. 3c is a cross-sectional view of the wheel assembly of FIG. 3a;

FIG. 3e is a schematic illustration of an outboard portion of the wheel assembly of FIG. 3a;

FIG. 4b is a perspective view of the wheel assembly of FIG. 4a;

FIG. 4c is a cross-sectional view of the wheel assembly of FIG. 4a;

DETAILED DESCRIPTION OF THE INVENTION

Figure 1A:
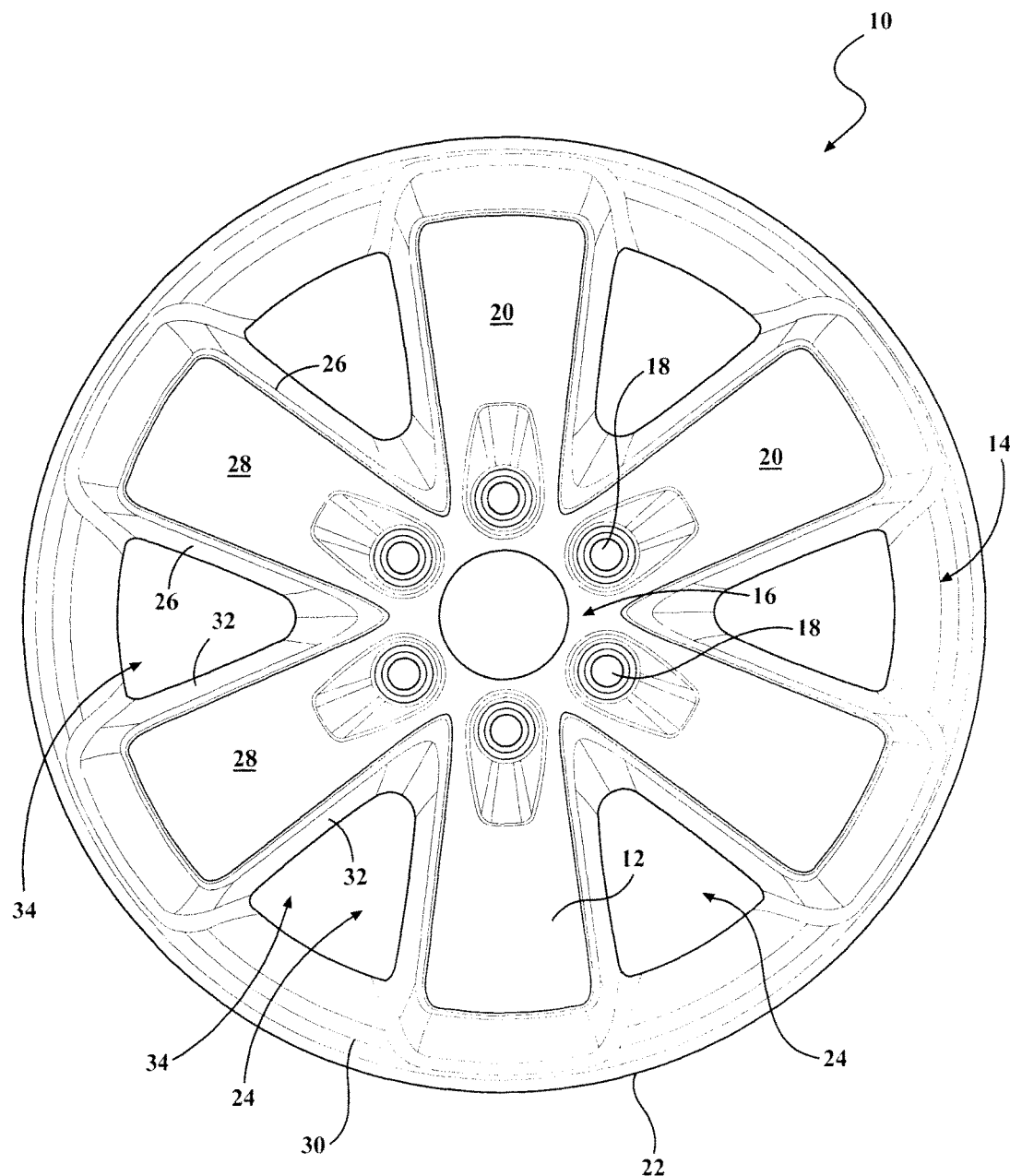
FIG. 1a is a front view of a wheel assembly according to an aspect of the present disclosure.
Figure 1B:
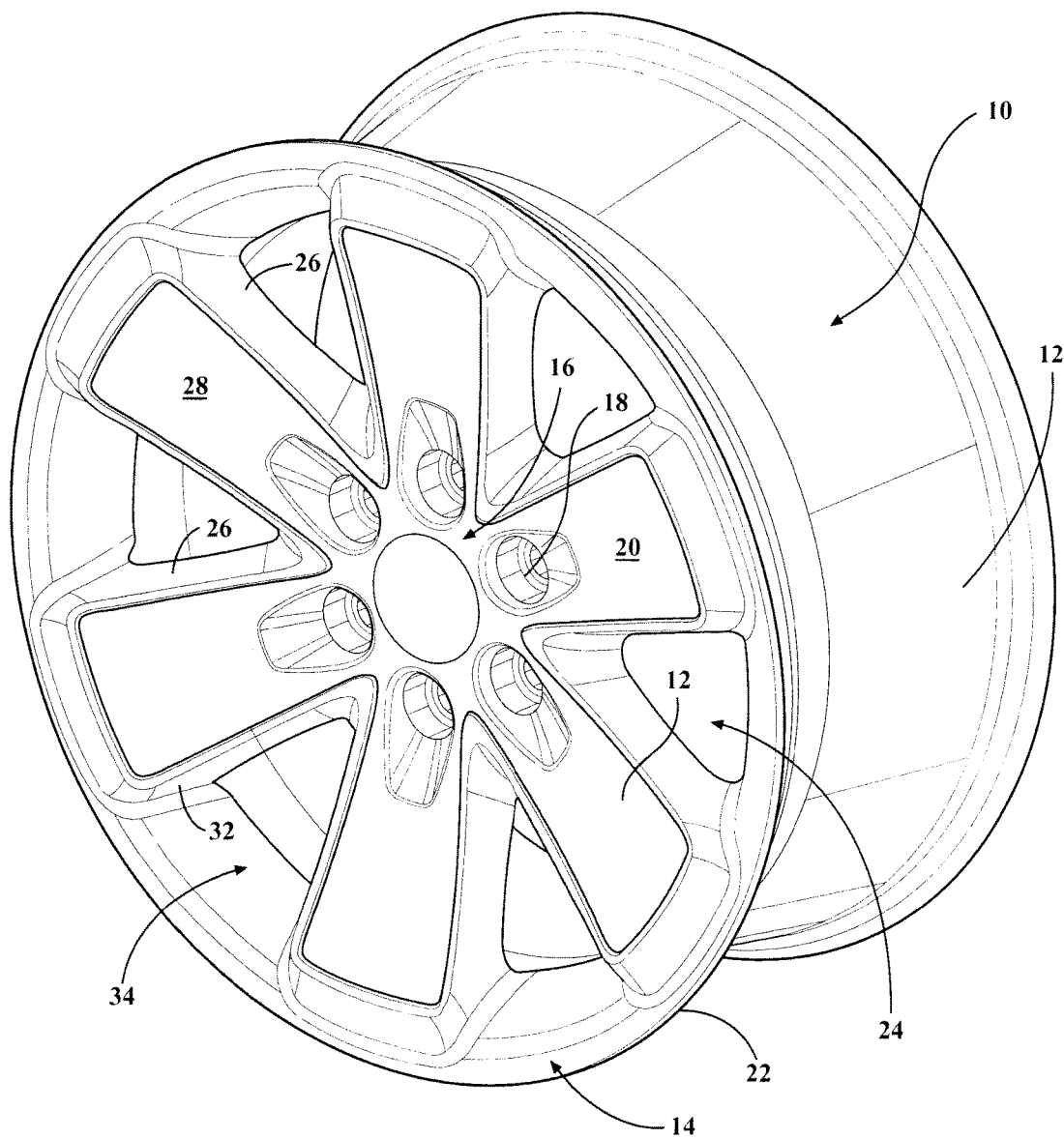
Figure 1C:
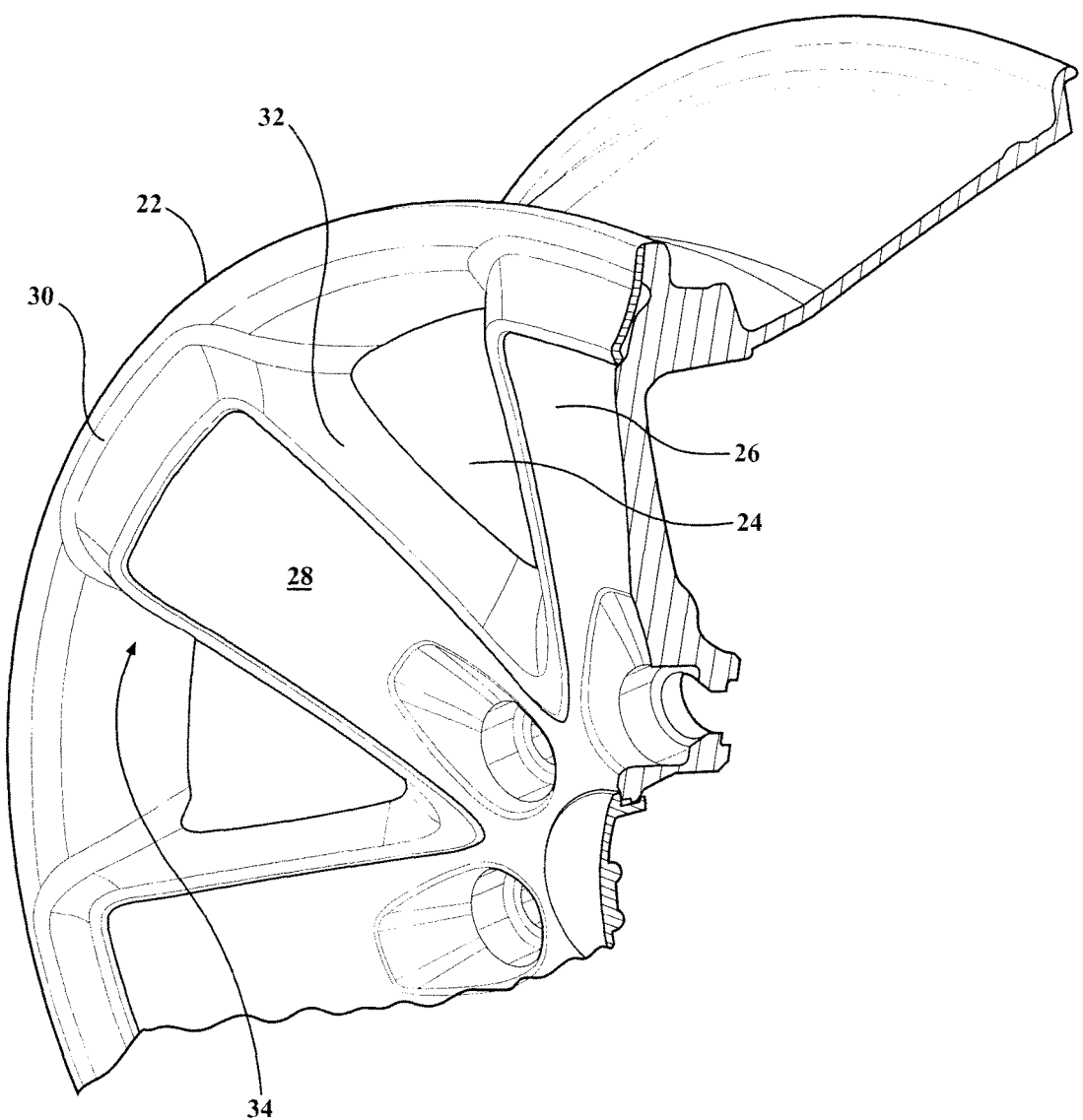
Figure 1D:
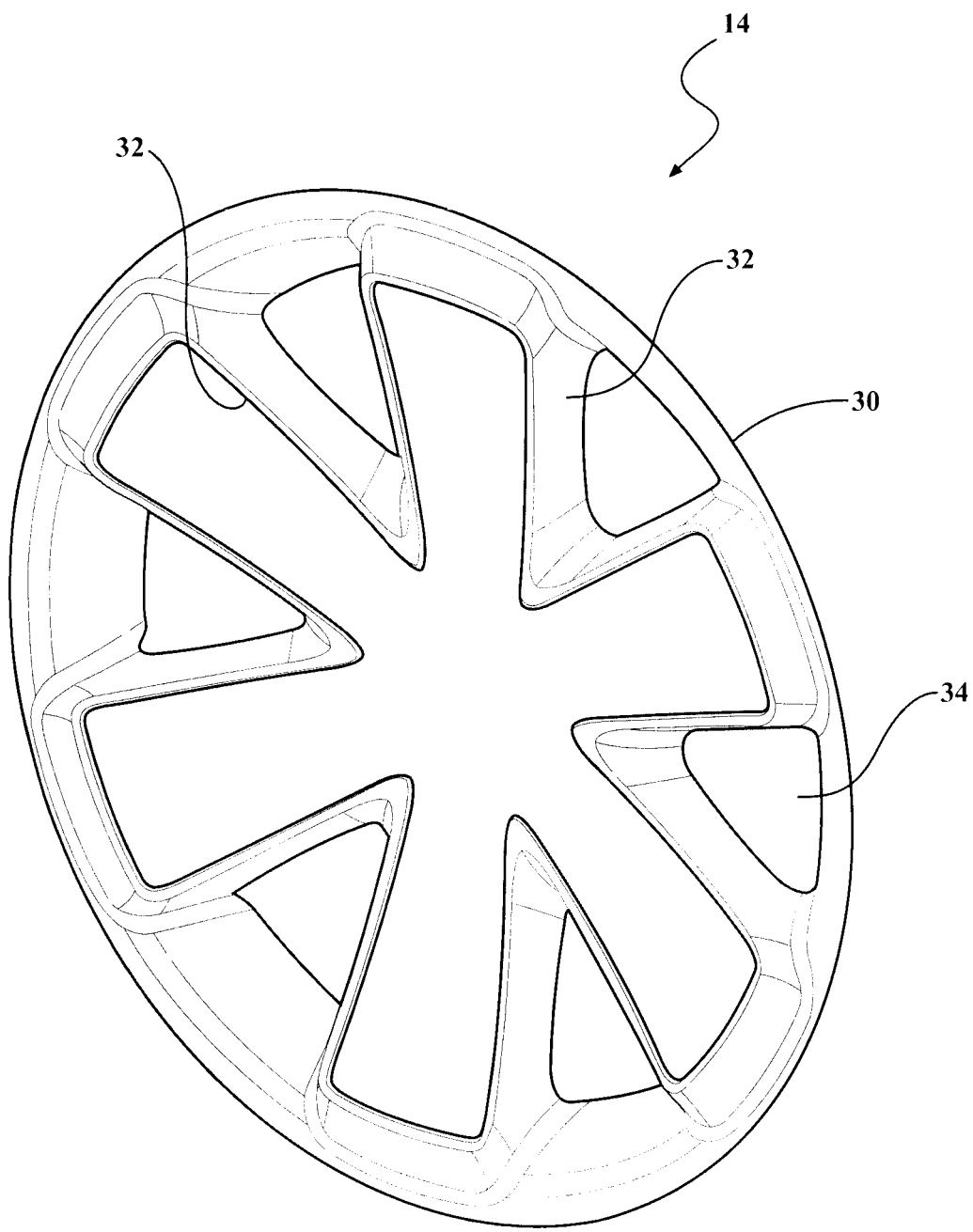
FIG. 1d is a perspective view of a cladding for a wheel assembly according to an aspect of the present disclosure.
Figure 2A:
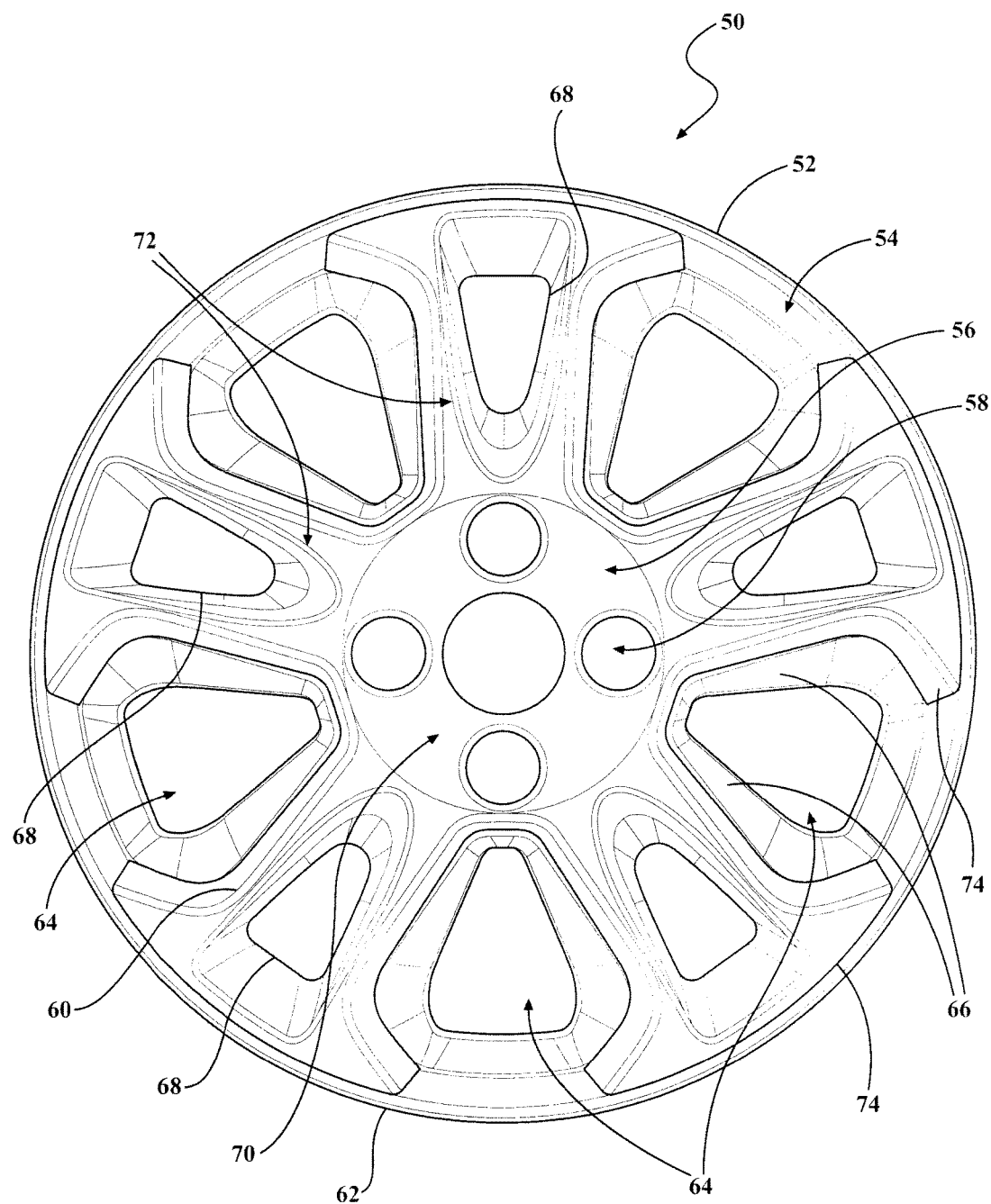
FIG. 2a is a front view of a wheel assembly according to another aspect of the present disclosure.
Figure 2B:
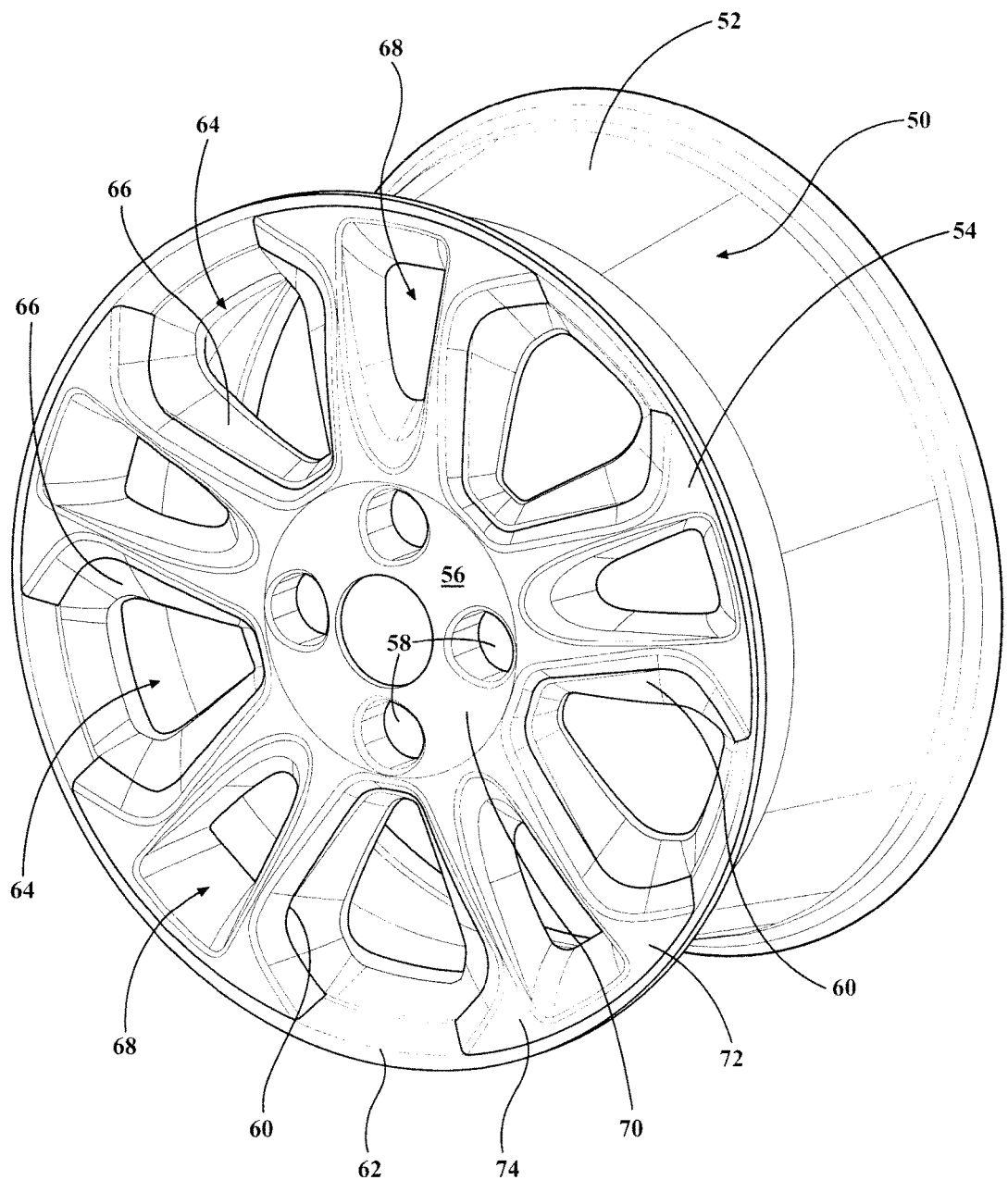
Figure 2C:
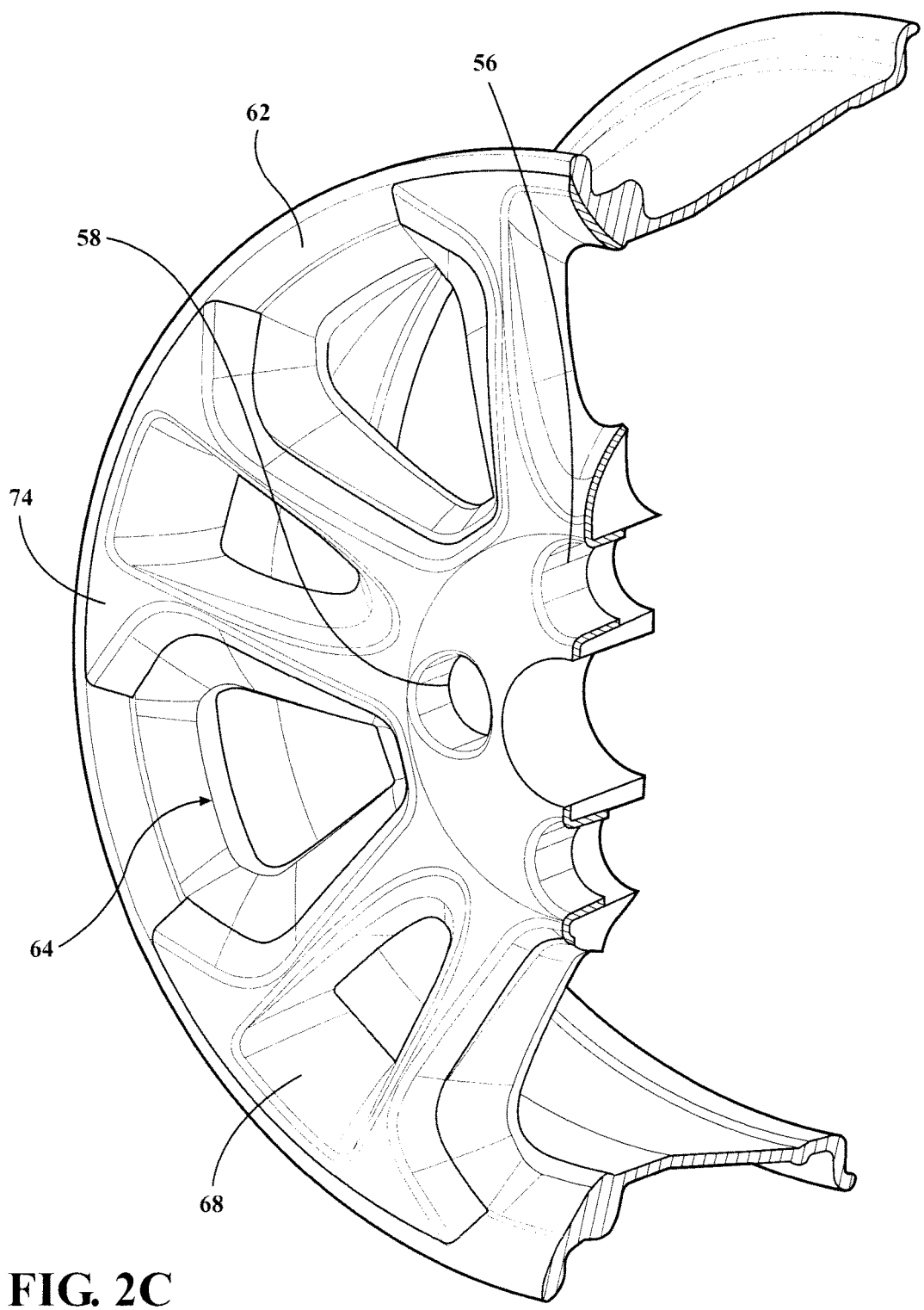
Figure 2D:
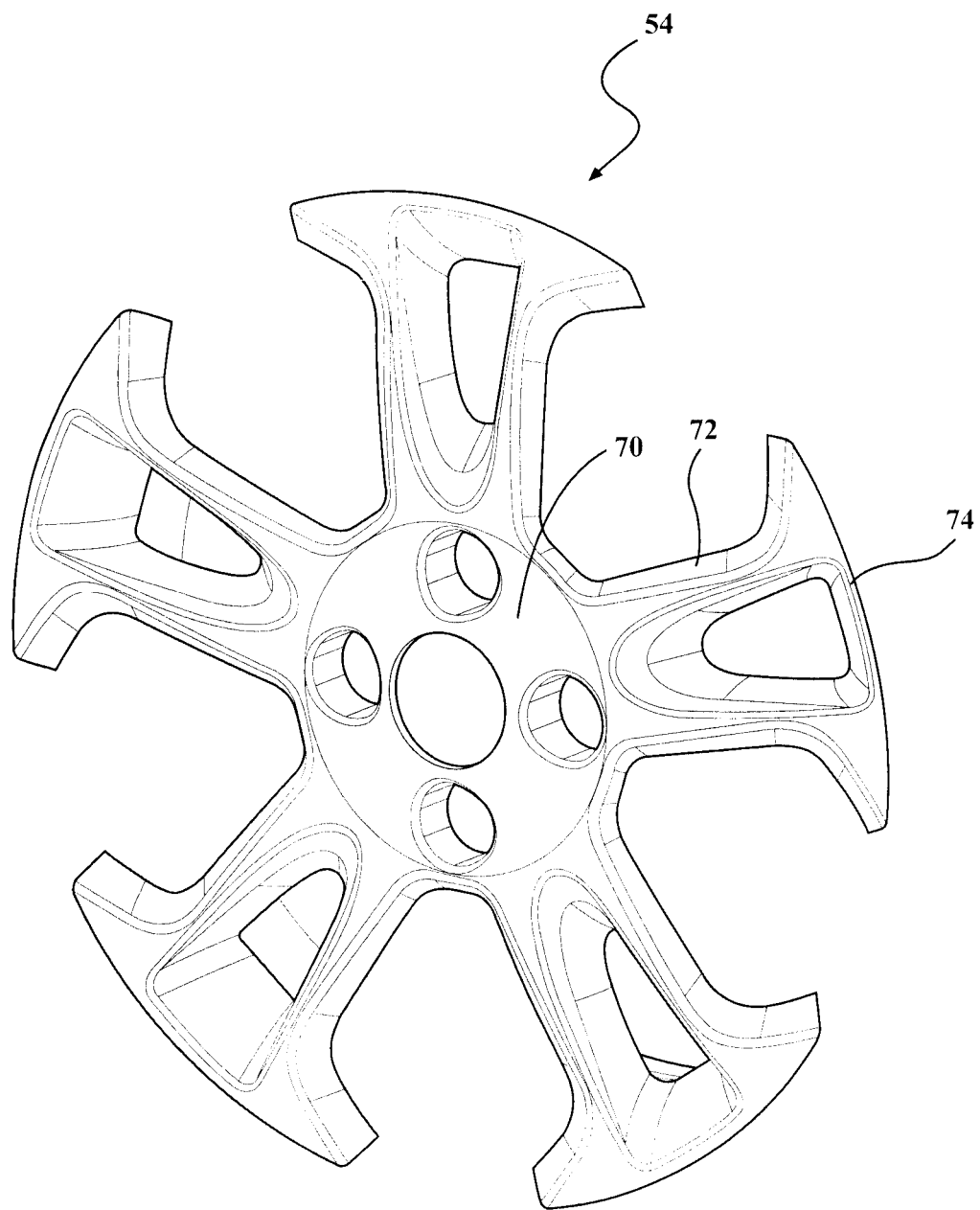
FIG. 2d is a perspective view of a cladding for a wheel assembly according to another aspect of the present disclosure.

For purposes of description herein, the terms "upper", "lower", "right", "left", "rear", "front", "vertical", "horizontal", "inner" and "outer" and derivatives thereof are intended merely for purposes of illustration and are not intended to be limiting. It is to be understood that the aspects of the disclosure may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. The specific dimensions and other physical characteristics relating to the aspects disclosed herein are not to be considered as limiting, unless the claims expressly state otherwise.

The present disclosure relates to a wheel assembly that provides improved aerodynamics and aesthetics. According to an aspect, the wheel assembly includes a backbone wheel and a cladding. According to an additional aspect, the cladding may be formed of a plastic structure, which has an outer surface that has been subjected to a metal plating process or other decorating procedures and materials, such as painting, hydrographic or molded in color. It will be appreciated that the cladding could be formed of other suitable materials, including metal or carbon fiber. According to another aspect, the cladding may be designed to cover only a portion of (less than the entirety of) the outboard wheel surface. In other words, the cladding can be designed such that when it is attached to the wheel, a significant portion of the wheel outboard face remains exposed. The metal plating may be accomplished through a chrome plating process. However, other metal plating processes, including those employing other metals may be utilized. Additionally, the metal plated surface of the cladding may have a variety of different colors. Different colors can be employed to provide a distinction (i.e., contrast) between the cladding surface and the exposed portion of the wheel surface. According to a further aspect, the metal plated surface could be selectively colored such that it has multiple colors, tones or shades.

According to an aspect, various different constructions of wheel assemblies can be utilized and various differently configured partial claddings could be employed that cover only a part of the wheel exterior or outboard surface. The aspects described below in connection with the drawings are merely exemplary and not intended to be limiting.

FIGS. 1a through 1d illustrate an exemplary wheel assembly 10 according to an aspect of the present disclosure. The wheel assembly 10 includes a backbone wheel 12 and a cladding 14. According to an aspect, the cladding 14 may be a metal plated structure that can be permanently secured to an outboard surface of the wheel 12. The wheel 12 can include a central hub portion 16, including a plurality of wheel lug openings 18, which allow for attachment of the wheel 12 to a vehicle for rotation therewith about an axis of rotation defined by the hub center. As shown, a plurality of wheel spokes 20 may extend outwardly from the hub portion 16 to a wheel rim 22. The wheel rim 22 may extend entirely around the periphery of the wheel 12 such that a plurality of turbine openings 24 may be defined between adjacent spokes 20 and a portion of the wheel rim 22. The wheel rim 22 can also include an upwardly extending flange portion (not shown). The wheel can also be configured for aerodynamic benefits, such as is disclosed in Applicant's co-pending U.S. patent application Ser. No. 14/212,914, entitled "Aerodynamically Efficient Spoke Design for a Vehicle Wheel", which is concurrently filed herewith and which is hereby incorporated by reference as though set forth fully herein.

According to an aspect, the cladding 14 (FIG. 1d) may be a single unitary structure that can be configured to overlie the outboard face of the wheel 12, but only cover a portion of the outboard face. Put another way, portions of the front or outboard face of the wheel 12 can remain exposed after the cladding 14 is attached thereto. According to another aspect and as shown in FIGS. 1a through 1d, the cladding 14 can include a uniform outer rim portion 30. According to a further aspect, the outer rim portion 30 can overlie the entirety of the wheel rim 22. However, the cladding 14 can be configured to only cover portions of the wheel outer rim 22, as discussed below. As shown, the cladding 14 may include a pair of side spoke portions 32 that overlay and cover the side surfaces 26 of the wheel spokes 20. Additionally, the cladding 14 may fully define a plurality of cover turbine openings 34 that surround and overlay the surfaces that define the wheel turbine openings 24, including the wheel spoke side surfaces and the wheel rim 22. According to a still further aspect, the hub portion 16 of the wheel 12 may be exposed. In other words, as shown, the cladding 14 does not include a central hub portion. As also shown, the outboard surfaces 28 of the wheel spokes 20 may remain exposed after the cladding 14 is secured to the wheel 12.

According to another aspect, the cladding 14 may be plated or otherwise treated such that it has a color that is different than the color of the surface of the wheel 12. The wheel surface can also be treated, as discussed above. This can provide an aesthetically pleasing contrast between the wheel surface and the clad surface. It will be appreciated that the amount of color difference can vary depending upon the degree of contrast that is sought. It will also be appreciated that the cladding 14 and the exposed outboard surface of the wheel 12 may have the same color, but vary in tone or shade. According to a further aspect, the cladding 14 may be plated or otherwise treated such that it includes accents or portions that are colored differently from one another. Put another way, the exterior of the cladding 14 itself could be plated or otherwise treated with a variety of different colors, color combinations and/or patterns. Such coloring of a cladding is known with an exemplary process being commercially available from Lacks Enterprises, Inc. and its Spinelle® product.

According to another aspect, the cladding 14 may be permanently attached to the wheel 12 through the use of an adhesive. The adhesive could be an RTV adhesive. Alternatively, the adhesive could be foam adhesive. Other suitable adhesives could also be employed.

FIGS. 2a through 2d illustrate another exemplary wheel assembly 50 according to an aspect of the disclosure. The wheel assembly 50 includes a backbone wheel 52 and a cladding 54. According to an aspect, the cladding 54 may be a metal plated structure that can be permanently secured to an outboard surface of the wheel 52. The wheel 52 can include a hub portion 56, including a plurality of wheel lug openings 58, which allow for attachment of the wheel 52 to a vehicle for rotation therewith about an axis of rotation defined by the hub center. As shown, a plurality of wheel spokes 60 may extend outwardly from the hub portion 56 to a wheel rim 62. The wheel rim 62 can extend entirely around the periphery of the wheel 52. According to an aspect, a plurality of turbine openings 64 may be defined between adjacent wheel spokes 60 and a corresponding portion of the wheel rim 62. The wheel rim 62 can also include an upwardly extending flange portion (not shown). According to another aspect, a spoke turbine opening 68 may be formed in each spoke 60. More or less spoke turbine openings 68 may be employed as desired.

According to this aspect, the cladding 54 (FIG. 2d) may be a single unitary structure that is configured to overlie the outboard face of the wheel 52, but only covers a portion thereof. Again, according to this aspect, portions of the outboard face of the wheel 52 can remain exposed after attachment of the cladding 54 to the wheel 52. As shown in FIGS. 2a through 2d, the cladding 54 may include a full hub portion 70 that overlies the hub portion 56 of the wheel 52. Additionally, the cladding 54 may include a plurality of spoke portions 72 that overlie each of the wheel spokes 60.

As shown, the cladding spoke portions 72 can partially overlie the side surfaces 66 of the wheel spokes 60 which surfaces define the wheel turbine openings 64 such that the lower portion of each of the wheel spoke side surfaces 66 remain exposed. According to another aspect, the cladding spoke portions 72 can completely cover the surfaces that define the wheel turbine openings 64, including the side surfaces thereof, such that none of the surfaces that define the wheel turbine opening surfaces remain exposed after the cladding 54 is attached to the wheel 52. According to a further aspect, the cladding 54 may include a rim portion 74 that is discontinuous. In other words, the rim portion 74 of the cladding 54 does not fully cover the wheel rim 62 such that part of the wheel rim 62 remains exposed after the cladding is attached to the wheel. Additionally, the cladding 54 may be configured such that it does not cover any upwardly extending flange portion. This combination can provide some aesthetically pleasing contrast between the cladding surface and the exposed wheel surface. Again, the cladding 54 may be attached to the wheel 52 by an adhesive such as an RTV adhesive or foam adhesive, as discussed above. Also, the wheel 52 and the cladding 54 can have different colors to yield unique aesthetics, as discussed above.

FIGS. 3a through 3e illustrate still another exemplary wheel assembly 80 according to an aspect of the disclosure. The wheel assembly 80 can include a backbone wheel 82 and a cladding 84. According to an aspect, the cladding 84 may be a metal plated structure that can be permanently secured to an outboard surface of the wheel 82. The wheel 82 may include a hub portion 86, including a plurality of wheel lug openings 88, which allow for attachment of the wheel 82 to a vehicle for rotation therewith about an axis of rotation defined by the hub center. A plurality of wheel spokes 90 may extend outwardly from the hub portion 86 to a wheel rim 92. The wheel rim 92 can extend entirely around the periphery of the wheel 82. According to an aspect, a plurality of turbine openings 94 may be defined between adjacent spokes 90 and a portion of the wheel rim 92.

Figure 3A:
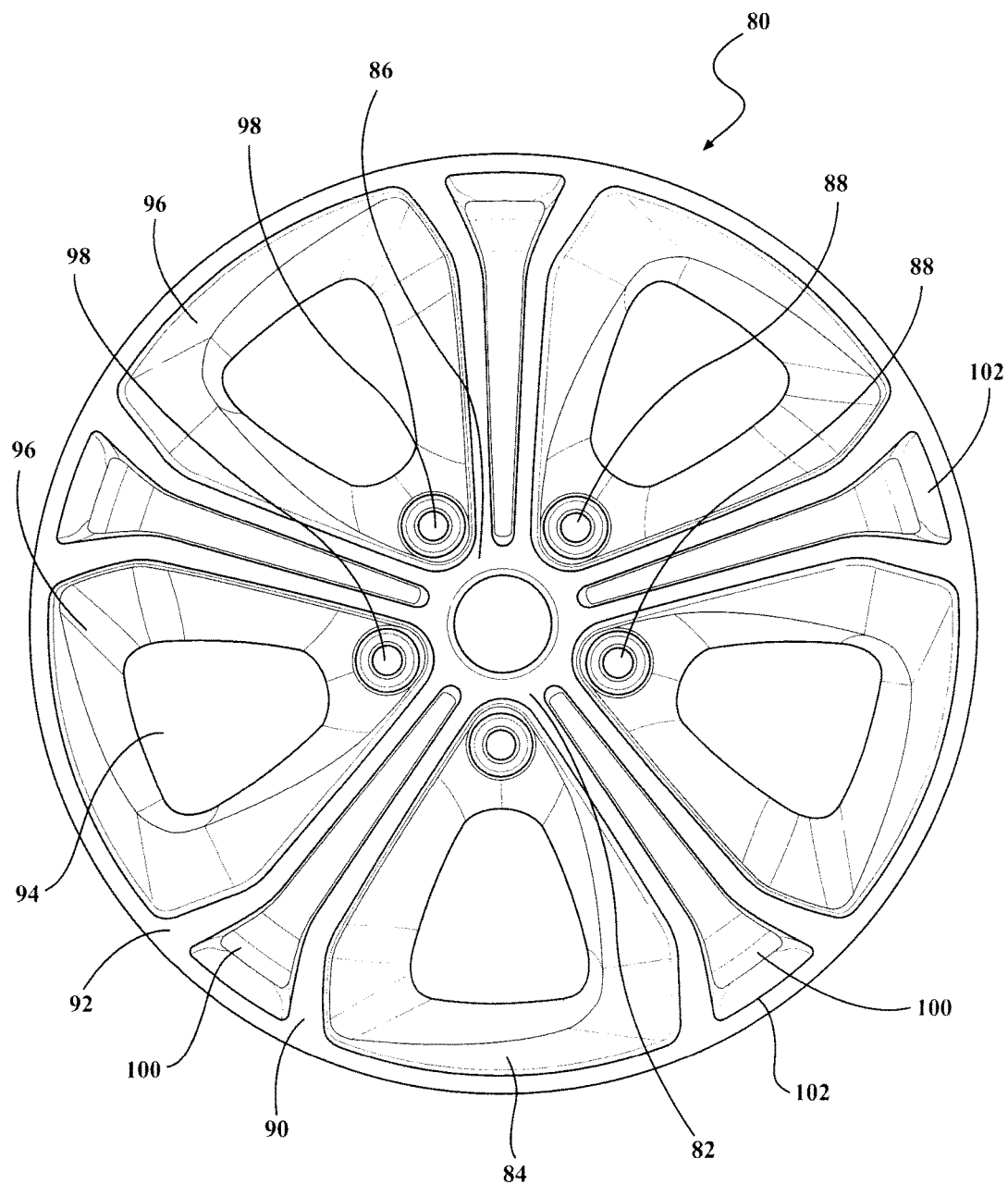
FIG. 3a is a front view of a wheel assembly according to still another aspect of the present disclosure.
Figure 3B:
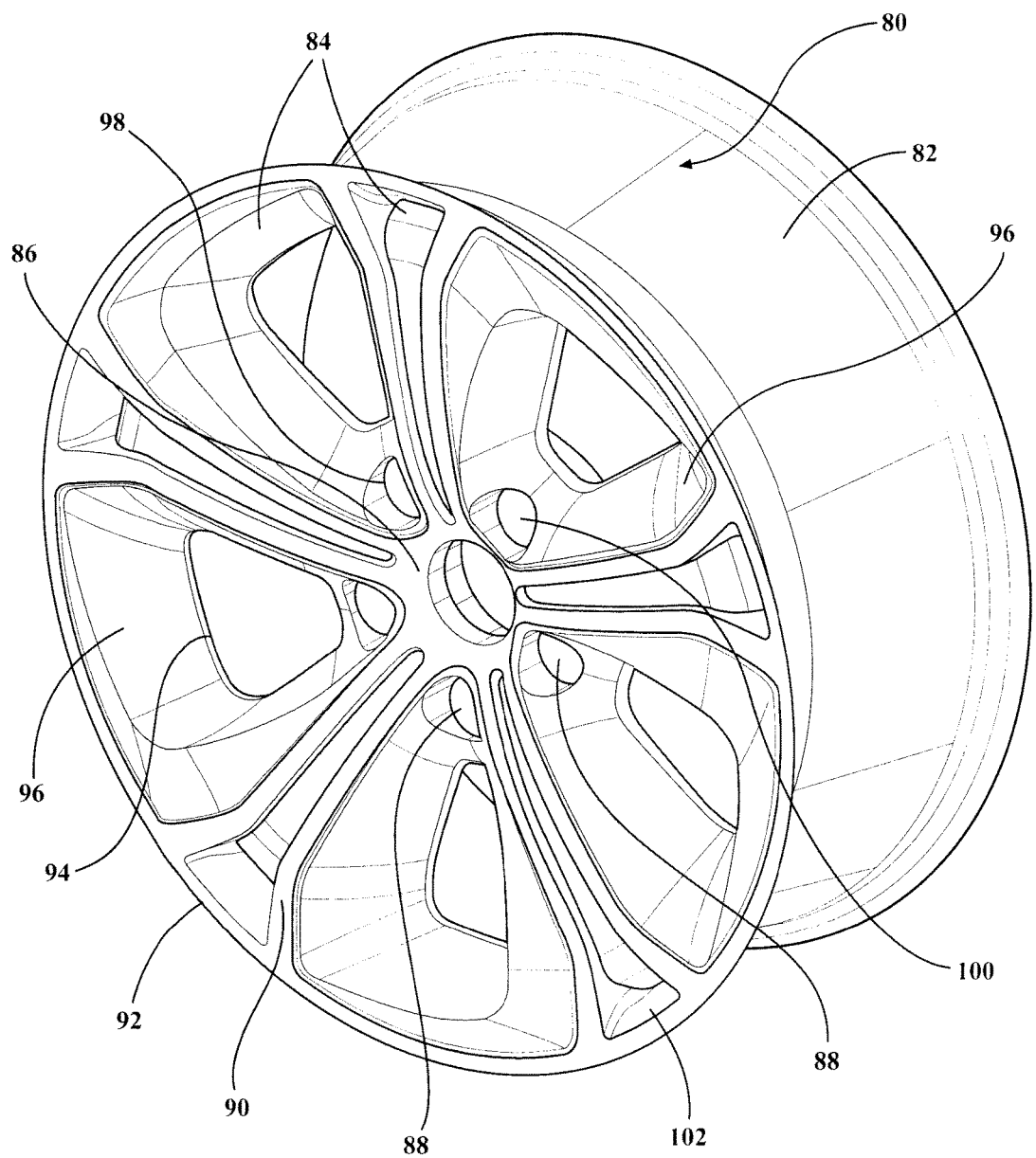
Figure 3C:
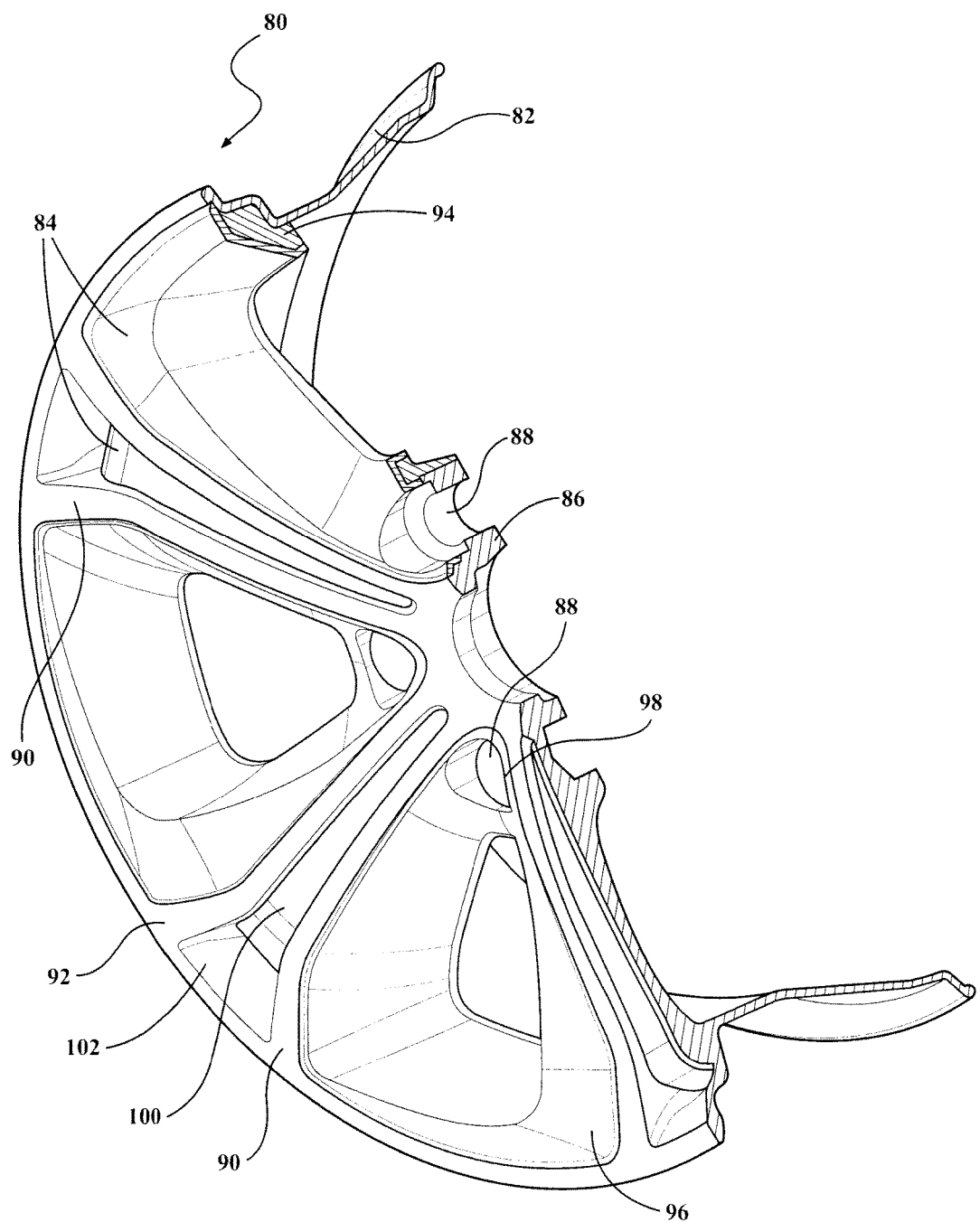
Figure 3D:
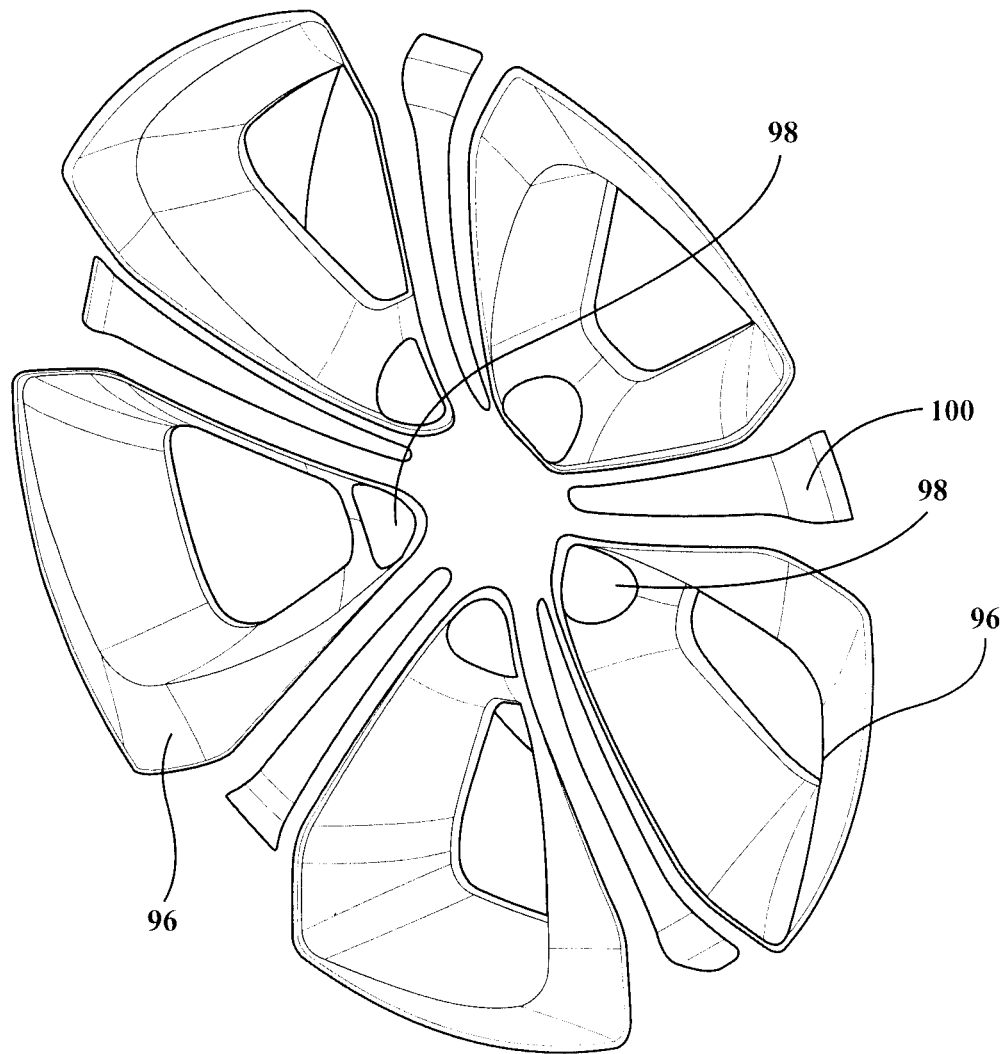
FIG. 3d is a perspective view of a cladding for a wheel assembly according to still another aspect of the present disclosure.
Figure 3E:
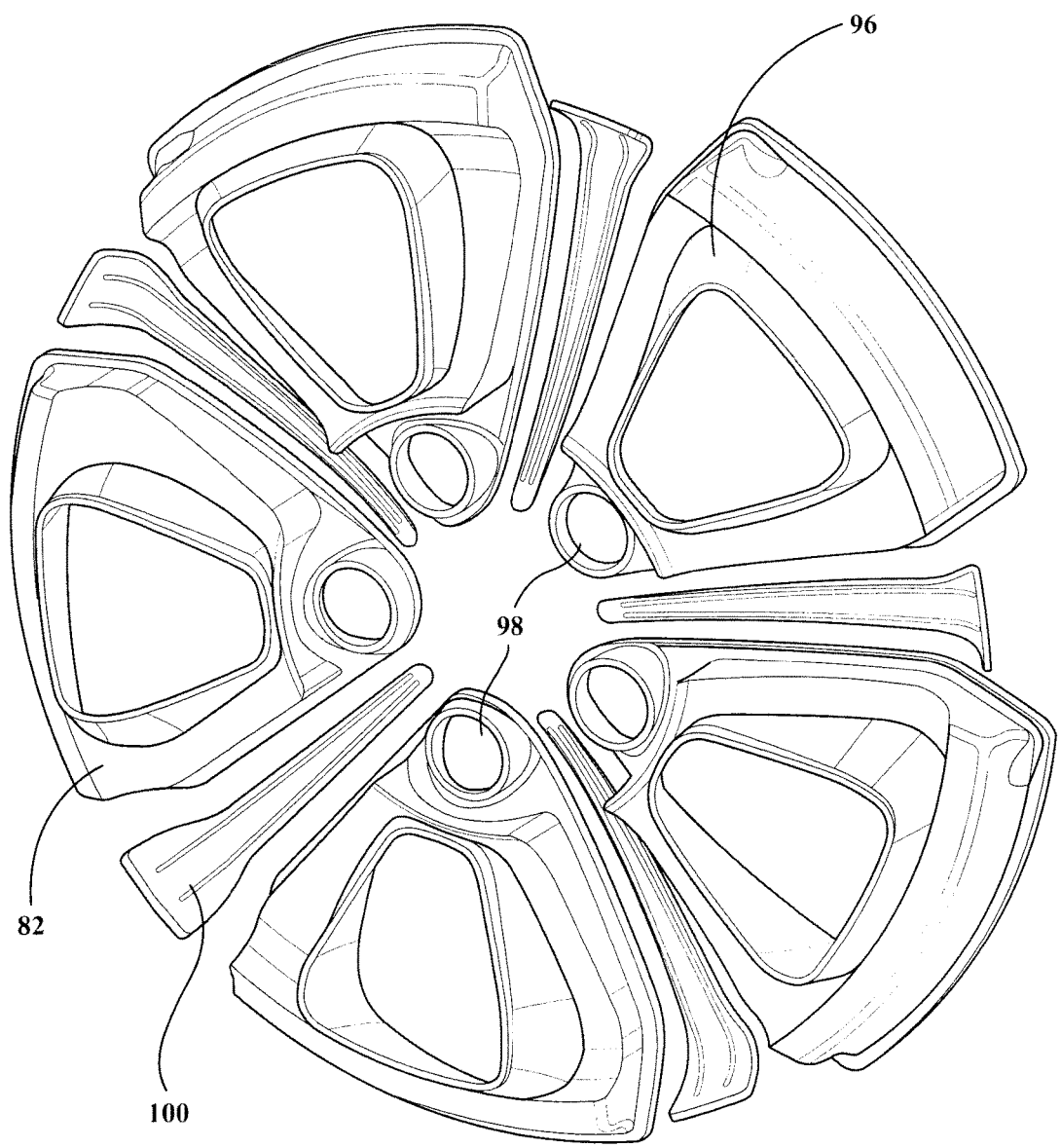
Figure 4A:
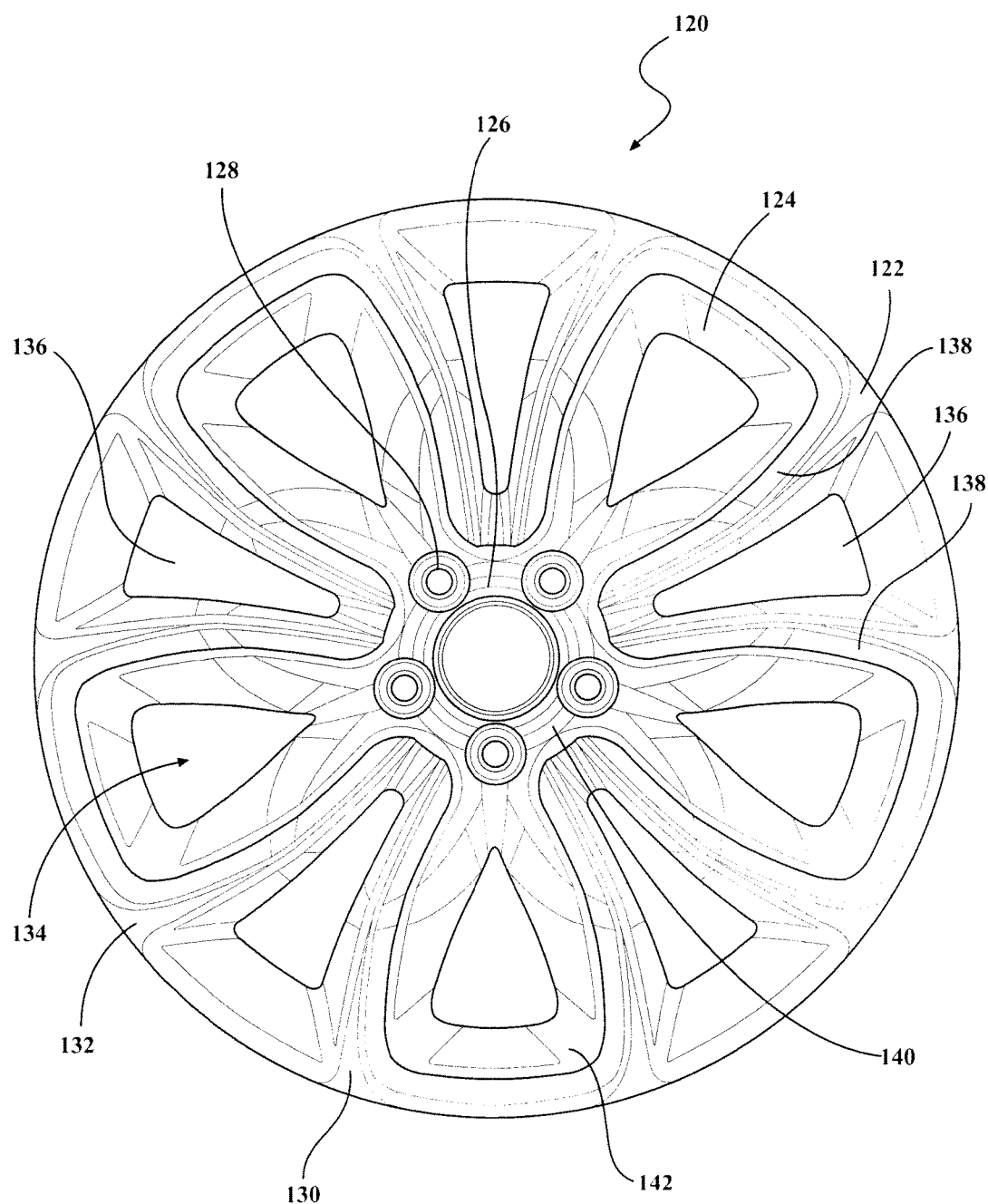
FIG. 4a is front view of a wheel assembly according to yet another aspect of the present disclosure.
Figure 4B:
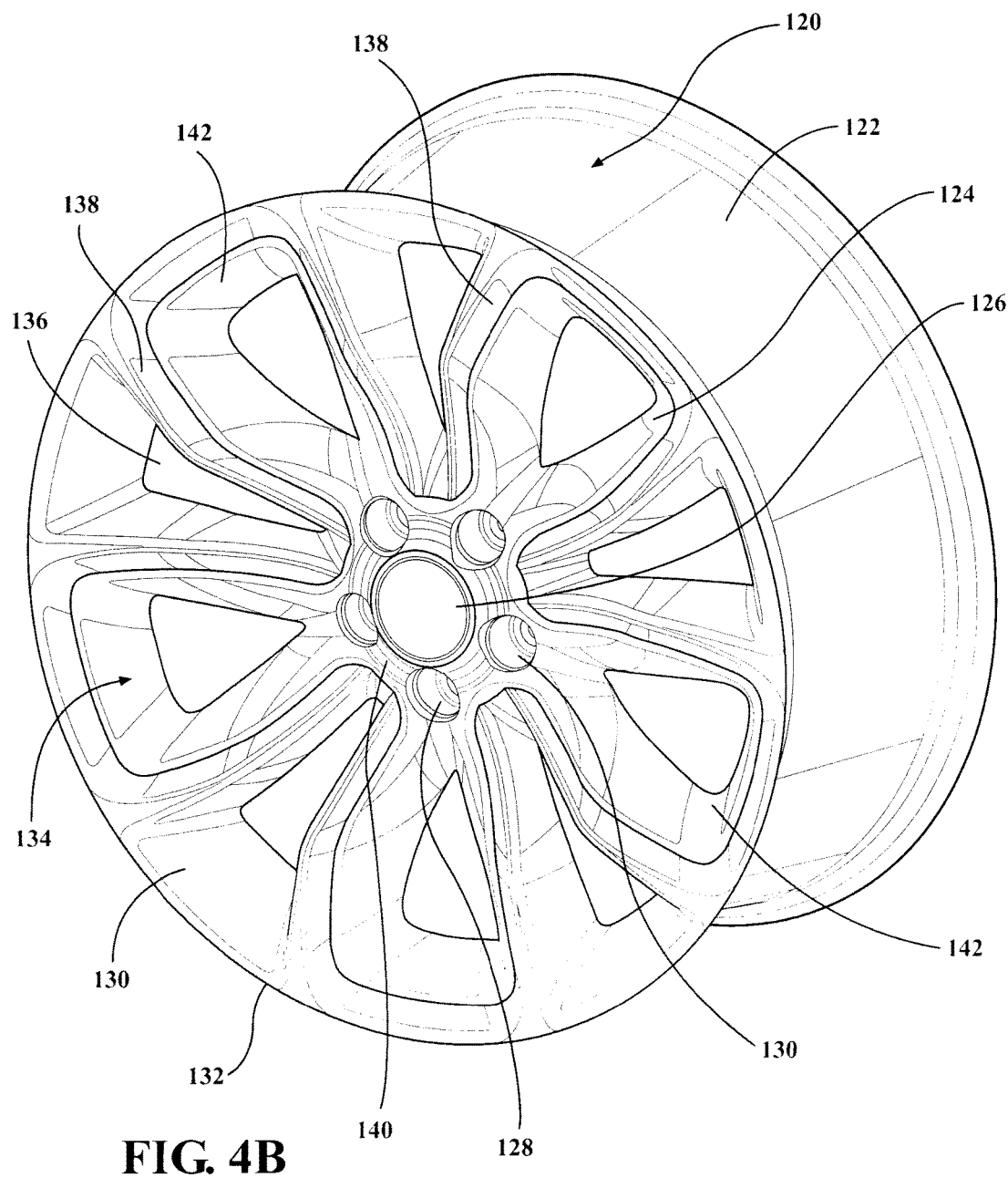
Figure 4C:
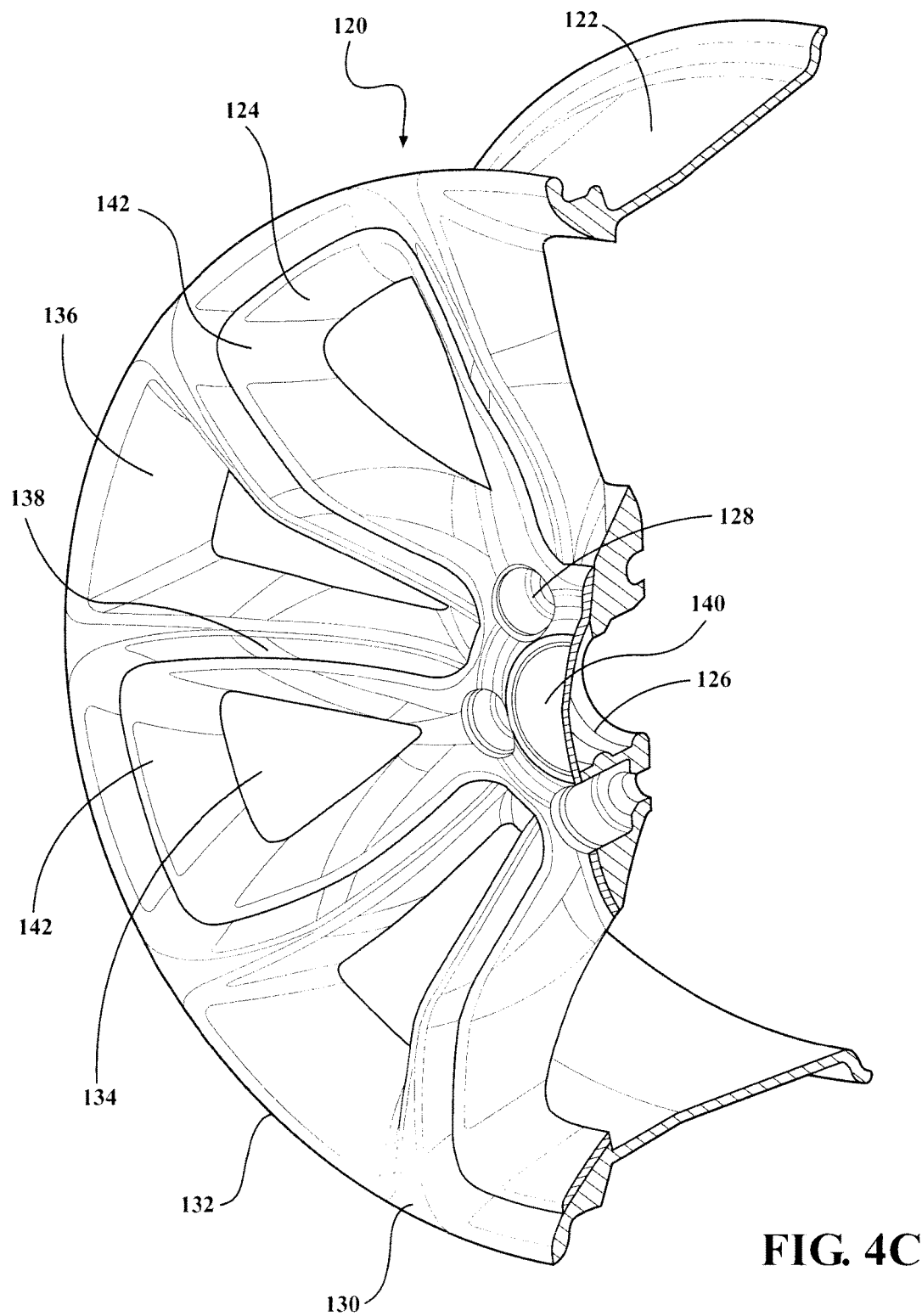
Figure 4D:
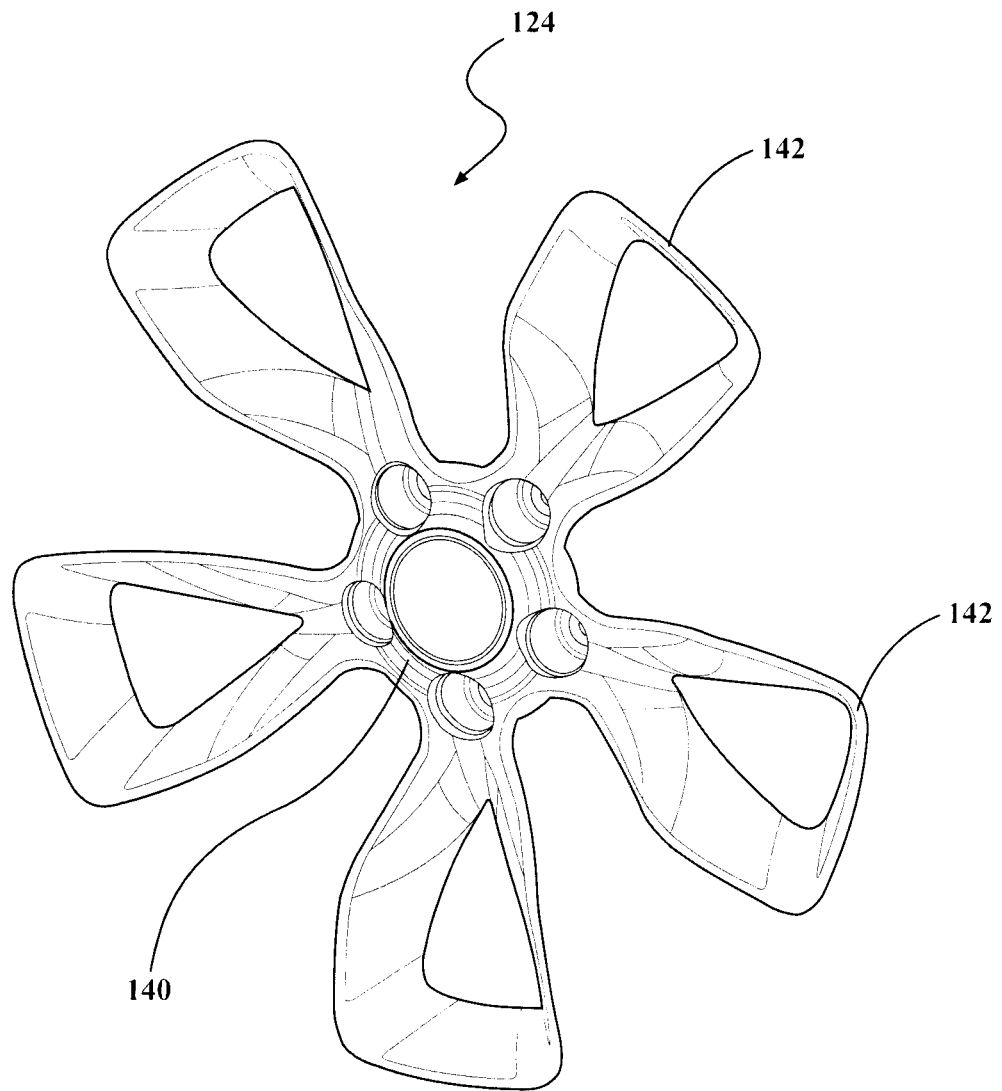
FIG. 4d is a perspective view of a cladding for a wheel assembly according to yet another aspect of the present disclosure.

According to one aspect, the cladding 84 (FIG. 3d) may be a single unitary structure that is configured to overlie the front or outboard face of the wheel 82, but only covers a portion thereof. Again, according to this aspect, portions of the front face of the wheel 82 can remain exposed after attachment of the cladding 84 to the wheel 82. As shown in FIGS. 3a through 3e, the cladding 84 may include a plurality of separate portions that together form the cladding 84. As shown in FIG. 3d, the cladding 84 can include a plurality of turbine portions 96 that can be nested within a respective one of the wheel turbine portions 94. The cladding turbine portions 96 can also include lug openings 98 integrally formed therewith that also may nest within a respective one of the wheel lug openings 88. Additionally, the cladding 84 can include a plurality of spoke portions 100 that overlie a middle portion 102 the outboard surface of the wheel spokes 90 such that the peripheries of the wheel spokes 90 remain exposed. As shown, the wheel spokes 90 may also include recesses 104 into which the clad spoke portions 100 may be nested and secured. With this configuration, portions of the wheel spokes 90 may be exposed and visible after attachment of the cladding 84. Similarly, portions of the wheel rim 92 also may remain exposed between the clad turbine portions 96 after attachment of the cladding 84 to the wheel 82. The clad portions may be secured to the wheel by an adhesive, as discussed above. Additionally, the wheel and the cladding may be constructed, treated or formed such that they have different colors, as discussed above.

FIGS. 4a through 4g illustrate various aspects of an exemplary wheel assembly 120 according to an aspect of the disclosure. The wheel assembly 120 includes a backbone wheel 122 and a cladding 124. According to an aspect, the cladding 124 may be a metal plated structure that can be permanently secured to an outboard surface of the wheel 122. The wheel 122 can include a hub portion 126, including a plurality of wheel lug openings 128 that allow for attachment of the wheel to a vehicle for rotation therewith about an axis of rotation defined by the hub center. According to an aspect, a plurality of wheel spokes 130 may extend outwardly from the hub portion 126 to a wheel rim 132. The wheel rim 132 may extend entirely around the periphery of the wheel 122 such that a plurality of turbine openings 134 can be defined between adjacent wheel spokes 130 and a corresponding portion of the wheel rim 132.

According to an aspect, the cladding 124 (FIG. 4d) may be a single unitary structure that is configured to overlie the outboard face of the wheel 122, but only covers a portion of the outboard face. Put another way, portions of the outboard face of the wheel 122 can remain exposed after attachment of the cladding 124 to the wheel 122. According to another aspect and as shown in FIGS. 4a through 4d, the cladding 124 may include a hub portion 140, which covers the entirety of the wheel hub portion 126. As shown, the cladding 124 may also include a plurality of side petal portions 142 that nest within a respective one of the turbine openings 134 and cover the surfaces that define the turbine openings 134. As shown, the petal portions 142 can fill in some of the wheel turbine openings 134 thereby making them smaller and may also cover the lower portions of the wheel spoke side surfaces 138. Alternatively, the petal portions 142 could be configured to cover the entirety of the wheel spoke side surfaces 138. According to an aspect, the entireties of the wheel spokes 130 may remain exposed along with the wheel spoke openings 136. According to another aspect, the wheel outer rim 132 may also remain uncovered and thus exposed. Again, the cladding 124 may be permanently attached to the wheel outboard surface by an adhesive such as an RTV adhesive or foam adhesive, as discussed above.

Figure 5:
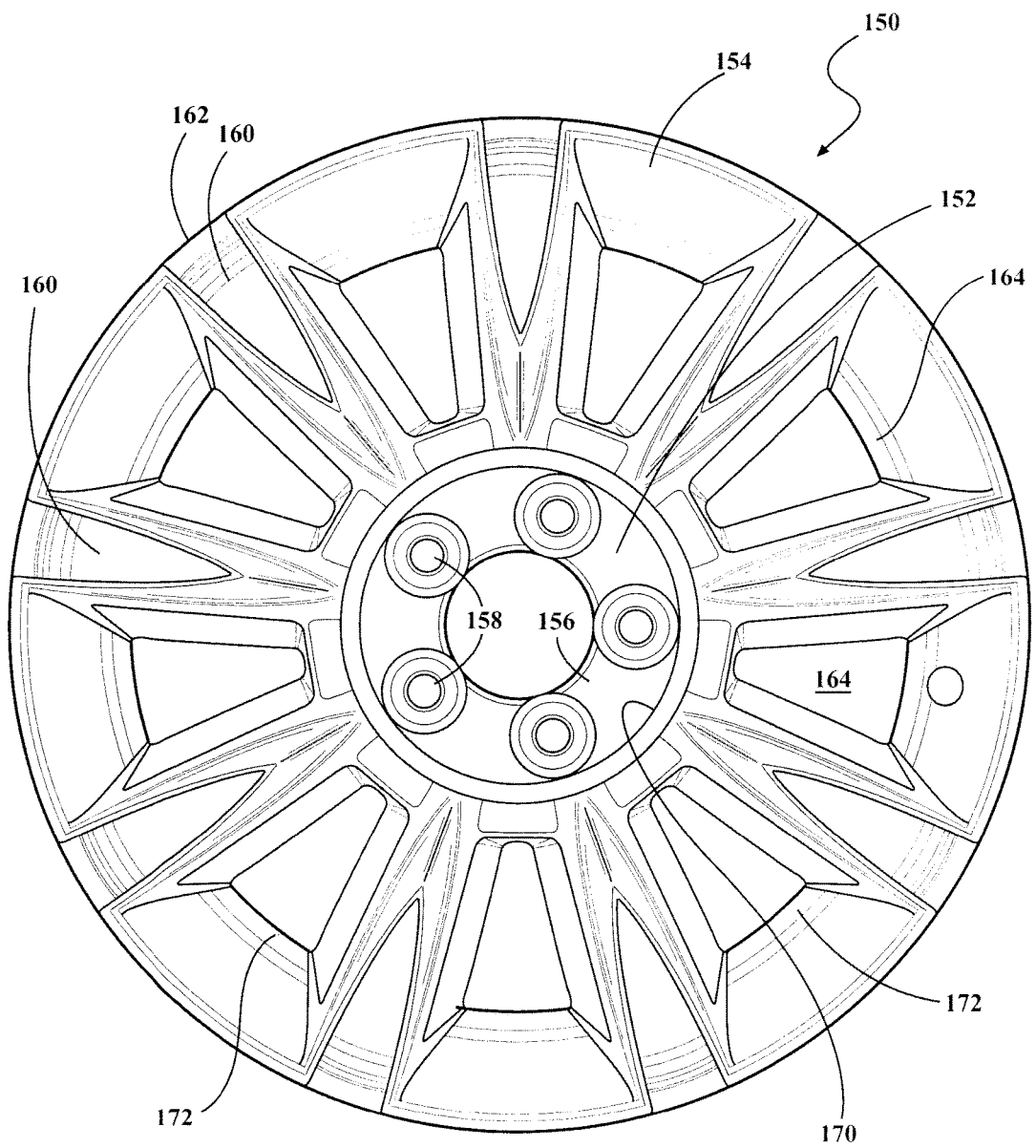
FIG. 5 is a perspective view of a wheel assembly according to a further aspect of the present disclosure.

FIG. 5 illustrates still another exemplary wheel assembly 150 according to an aspect of the disclosure. The wheel assembly 150 includes a backbone wheel 152 and a cladding 154. According to an aspect, the cladding 154 may be a metal plated structure that can be permanently secured to an outboard surface of the wheel 152. The wheel 152 can include a hub portion 156, including a plurality of wheel lug openings 158, which allow for attachment of the wheel 152 to a vehicle for rotation therewith about an axis of rotation defined by the hub center. As shown, a plurality of wheel spokes 160 may extend outwardly from the hub portion 156 to a wheel rim 162. The wheel rim 162 can extend entirely around the periphery of the wheel 152. According to an aspect, a plurality of turbine openings 164 may be defined between adjacent wheel spokes 160 and a corresponding portion of the wheel rim 162. The wheel rim 162 can also include an upwardly extending flange portion (not shown).

According to this aspect, the cladding 154 may be a single unitary structure that is configured to overlie the outboard face of the wheel 152, but only covers a portion thereof. Again, according to this aspect, portions of the outboard face of the wheel 152 can remain exposed after attachment of the cladding 154 to the wheel 152. As shown, the cladding 154 may include an inner periphery 170 that terminates adjacent an inner end of the wheel spokes 160 and the wheel hub portion 156. By this configuration, the cladding 154 need not include any cladding hub portion and the wheel hub portion 156 can remain exposed after the cladding 154 is attached to the wheel 152. Additionally, the cladding 154 may include a plurality of cladding turbine portions 172 that overlie the wheel turbine opening spokes 160 such that they are made efficiently smaller. According to another aspect, the cladding 154 need not include any spoke portions such that considerable portions of the wheel spoke portions 160 remain exposed after attachment of the cladding 154 to the wheel 152. According to a further aspect, the cladding 154 is configured such that it does not include any rim portion between the plurality of turbine openings 172. In other words, part of the wheel rim 162 remains exposed after the cladding 154 is attached to the wheel 152. Additionally, the cladding 154 may be configured such that it does not cover any upwardly extending flange portion. This combination can provide some aesthetically pleasing contrast between the cladding surface and the exposed wheel surface. Again, as discussed above, the cladding 154 may be attached to the wheel 152 by an adhesive such as an RTV adhesive or foam adhesive. As also discussed above, the wheel 152 and the cladding 154 can have different colored outboard surfaces for aesthetic purposes.

Figure 6:
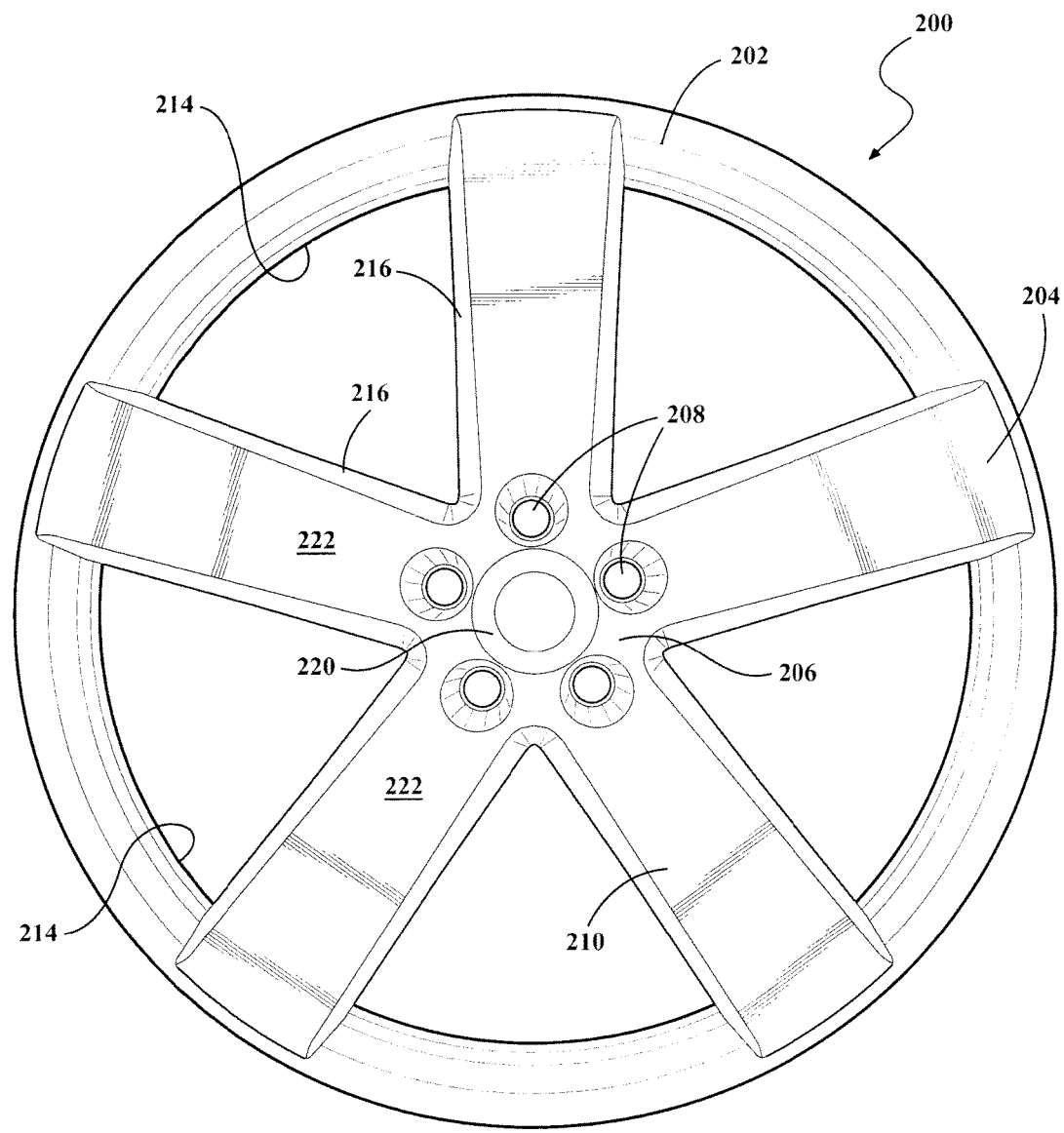
FIG. 6 is a perspective view of still a further aspect of the present disclosure.

FIG. 6 illustrates another exemplary wheel assembly 200 according to an aspect of the disclosure. The wheel assembly 200 includes a backbone wheel 202 and a cladding 204. According to an aspect, the cladding 204 may be a metal plated structure that can be permanently secured to an outboard surface of the wheel 202. The wheel 202 can include a hub portion 206, including a plurality of wheel lug openings 208, which allow for attachment of the wheel 202 to a vehicle for rotation therewith about an axis of rotation defined by the hub center. As shown, a plurality of wheel spokes 210 may extend outwardly from the hub portion 206 to a wheel rim 212. The wheel rim 212 can extend entirely around the periphery of the wheel. According to an aspect, a plurality of turbine openings 214 may be defined between adjacent wheel spokes 210 and a corresponding portion of the wheel rim 212. The wheel rim 212 can also include an upwardly extending flange portion (not shown).

According to this aspect, the cladding 204 may be a single unitary structure that is configured to overlie the outboard face of the wheel 202, but only covers a portion thereof. Again, according to this aspect, portions of the outboard face of the wheel 202 can remain exposed after the cladding 204 is attached to the wheel 202. As shown, the cladding 204 may include a full hub portion 220 that overlies the hub portion 206 of the wheel 202. Additionally, the cladding 204 may include a plurality of spoke portions 222 that overlie a respective one of the wheel spokes 210. According to a further aspect, the spoke portions 222 may extend downwardly into the wheel turbine openings 214 such that side portions 216 of the wheel spokes 210 may be covered by the cladding spoke portions 222. The cladding spoke portions 222 can cover some, all or none of the wheel spoke side portions 216. According to a further aspect, the cladding 204 may be configured to leave the majority of the wheel rim portion 212 exposed such that it remains exposed after the cladding 204 is attached to the wheel 202. Additionally, the cladding 204 may be configured such that it does not cover any upwardly extending flange portion. This combination can provide some aesthetically pleasing contrast between the cladding surface and the exposed wheel surface, which can be formed of different colors, as discussed above. Again, as discussed above the cladding 204 may be attached to the wheel 202 by an adhesive such as an RTV adhesive or foam adhesive.

Figure 7:
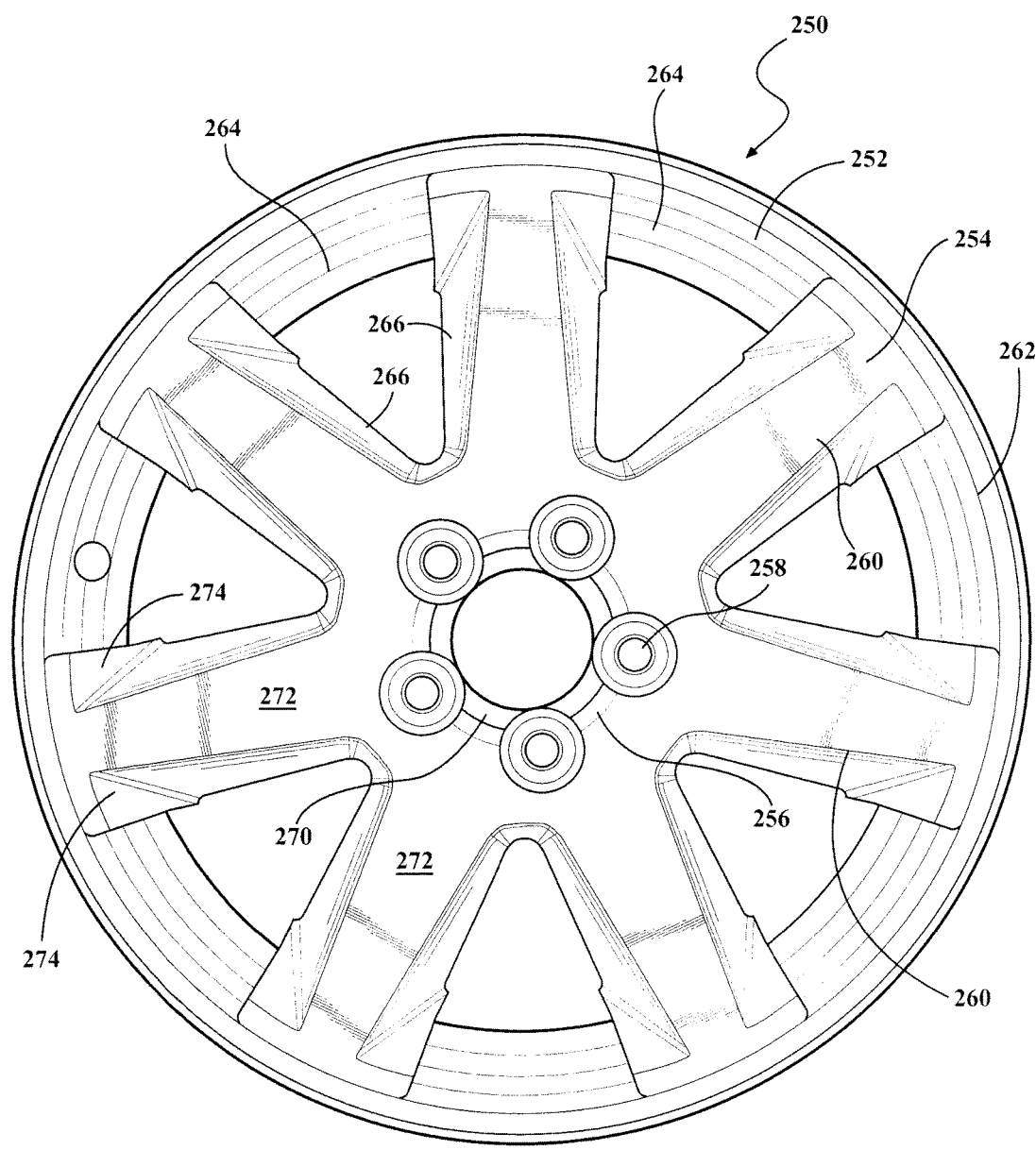
FIG. 7 is a perspective view of a wheel assembly according to yet a further aspect of the present disclosure.

FIG. 7 illustrates another exemplary wheel assembly 250 according to an aspect of the disclosure. The wheel assembly 250 includes a backbone wheel 252 and a cladding 254. According to an aspect, the cladding 254 may be a metal plated structure that can be permanently secured to an outboard surface of the wheel 252. The wheel 252 can include a hub portion 256, including a plurality of wheel lug openings 258, which allow for attachment of the wheel 252 to a vehicle for rotation therewith about an axis of rotation defined by the hub center. As shown, a plurality of wheel spokes 260 may extend outwardly from the hub portion 256 to a wheel rim 262. The wheel rim 262 can extend entirely around the periphery of the wheel. According to an aspect, a plurality of turbine openings 264 may be defined between adjacent wheel spokes 260 and a corresponding portion of the wheel rim 262. The wheel rim 262 can also include an upwardly extending flange portion (not shown).

According to this aspect, the cladding 254 may be a single unitary structure that is configured to overlie the outboard face of the wheel 252, but only covers a portion thereof. Again, according to this aspect, portions of the outboard face of the wheel 252 can remain exposed after attachment of the cladding 254 to the wheel 252. As shown, the cladding 254 may include a full hub portion 270 that overlies the hub portion 256 of the wheel 252. Additionally, the cladding 254 may include a plurality of spoke portions 272 that overlie the wheel spokes 260. According to a further aspect, the spoke portions 272 may extend downwardly into the wheel turbine openings 264 such that side portions 266 of the wheel spokes 260 are covered by the clad spoke portions 272. The clad spoke portions 272 can cover some, all or none of the wheel spoke side portions 266. According to a further aspect, the cladding 254 can be configured to leave the majority of the rim portion 262 exposed after the cladding 254 is attached to the wheel 252. According to a further aspect, the cladding 254 can include clad spoke flanges 274 disposed at an outer end of the clad spokes 272, which are configured to overlie a portion of the wheel rim 262 on either side of the wheel spokes 260. Additionally, the cladding 254 may be configured such that it does not cover any upwardly extending flange portion. This combination can provide some aesthetically pleasing contrast between the cladding surface and the exposed wheel surface, which as discussed above, may be formed of a different color. Again, as discussed above, the cladding 254 may be attached to the wheel 252 by an adhesive such as an RTV adhesive or foam adhesive.

Figure 8:
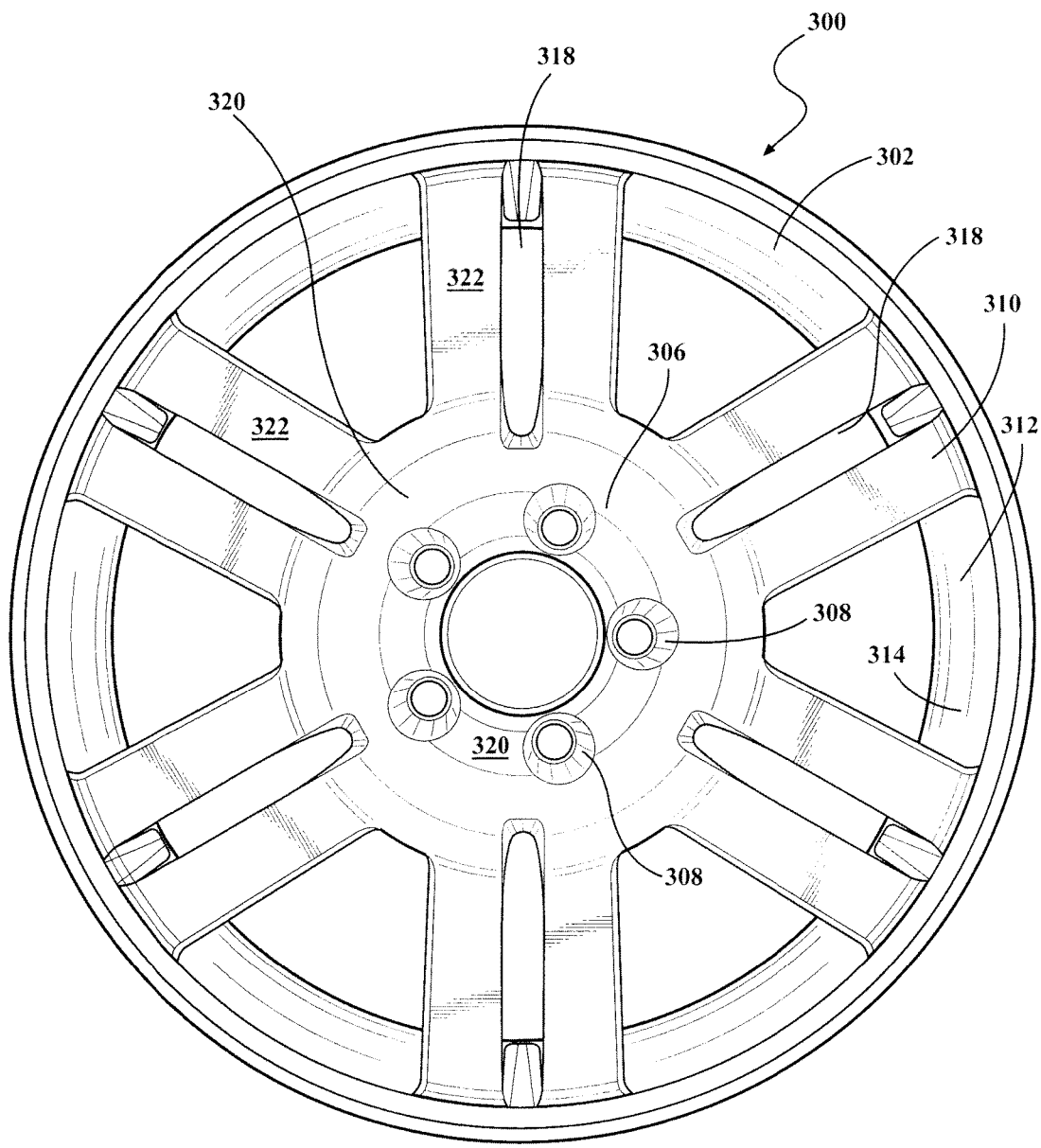
FIG. 8 is a perspective view of a wheel assembly according to still yet a further aspect of the present disclosure.

FIG. 8 illustrates another exemplary wheel assembly 300 according to an aspect of the disclosure. The wheel assembly 300 includes a backbone wheel 302 and a cladding 304. According to an aspect, the cladding 304 may be a metal plated structure that can be permanently secured to an outboard surface of the wheel 302. The wheel 302 can include a hub portion 306, including a plurality of wheel lug openings 308, which allow for attachment of the wheel 302 to a vehicle for rotation therewith about an axis of rotation defined by the hub center. As shown, a plurality of wheel spokes 310 may extend outwardly from the hub portion 306 to a wheel rim 312. The wheel rim 312 can extend entirely around the periphery of the wheel 302. According to an aspect, a plurality of turbine openings 314 may be defined between adjacent wheel spokes 310 and a corresponding portion of the wheel rim 312. The wheel rim 312 can also include an upwardly extending flange portion (not shown). According to another aspect, a spoke opening 318 may be formed in each spoke 310.

According to this aspect, the cladding 304 may be a single unitary structure that is configured to overlie the outboard face of the wheel 302, but only covers a portion thereof. Again, according to this aspect, portions of the outboard face of the wheel 302 can remain exposed after attachment of the cladding 304 to the wheel 302. As shown, the cladding 304 may include a full hub portion 320 that overlies the hub portion 306 of the wheel 302. Additionally, the cladding 304 may include spoke portions 322 that overlie a respective one of the wheel spokes 310. According to an aspect, the cladding spoke portions 322 can partially overlie wheel spoke side surfaces 316 partially or completely. Alternatively, the wheel spoke side surfaces 316 may remain exposed after attachment of the cladding 304 to the wheel outboard face. According to a further aspect, the cladding 304 may be configured such that the wheel rim portion 312 remains exposed (wholly or partially) after attachment of the cladding 304 to the wheel 302. According to another aspect, the cladding 304 can also include 324 spoke openings that overlie the surfaces that form the wheel spoke openings 318 such that the wheel spoke openings 318 remain exposed in the final wheel assembly 300. Additionally, the cladding 304 may be configured such that it does not cover any upwardly extending flange portion. This combination can provide some aesthetically pleasing contrast between the cladding surface and the exposed wheel surface. As discussed above, the wheel 302 and the cladding 304 may be formed or otherwise treated to have different colors on the outboard surfaces for aesthetic purposes. Again, the cladding 304 may be attached to the wheel 302 by an adhesive such as an RTV adhesive or foam adhesive.

It will be appreciated that the above examples are merely illustrative and an infinite number of other wheel assembly combinations and configurations may be employed.

Figure 9A:
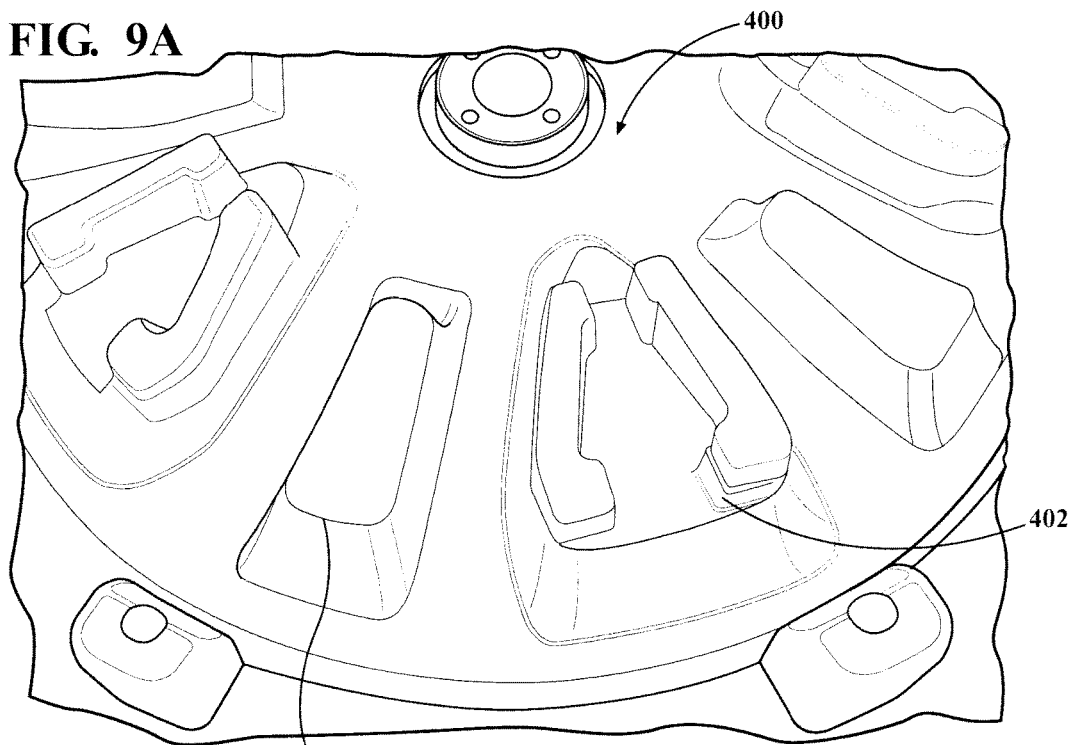
FIG. 9a is a schematic illustration of a wheel assembly pallet for use in assembling a wheel assembly according to an aspect of the present disclosure.

FIGS. 9a through 9e illustrate an exemplary assembly process for a wheel assembly in accordance with an aspect of the disclosure. FIG. 9a schematically illustrates a pallet 400 that can be used in the assembly process for a wheel assembly according to an aspect of the present disclosure. As shown, the pallet 400 can include a plurality of locating structures 402, 404 that may be configured to assist in locating the wheel and the cladding, respectively. According to an aspect, the locating structures 402, 404 can extend upwards to engage features of the wheel and the cladding to assist with the location function of elements of the wheel assembly. According to another aspect, the locating structures 402, 404 may be constructed of a generally pliable material that allows for their deflection and application of a subsequent resistive force to accommodate variations in surface tolerances as the wheel and the cladding are positioned thereon. The location, positioning and number of locating structures can obviously vary depending upon the configuration of the wheel and the cladding that together form the wheel assembly. According to another aspect, the pallet 400 may also be formed with other structures that contact the wheel spokes or wheel turbine openings to assist in locating the wheel with respect to the cladding and the pallet. The pallet 400 may also be formed with pockets that allow for the accommodation of any tolerances that may exist in the wheel surfaces.

Figure 9B:
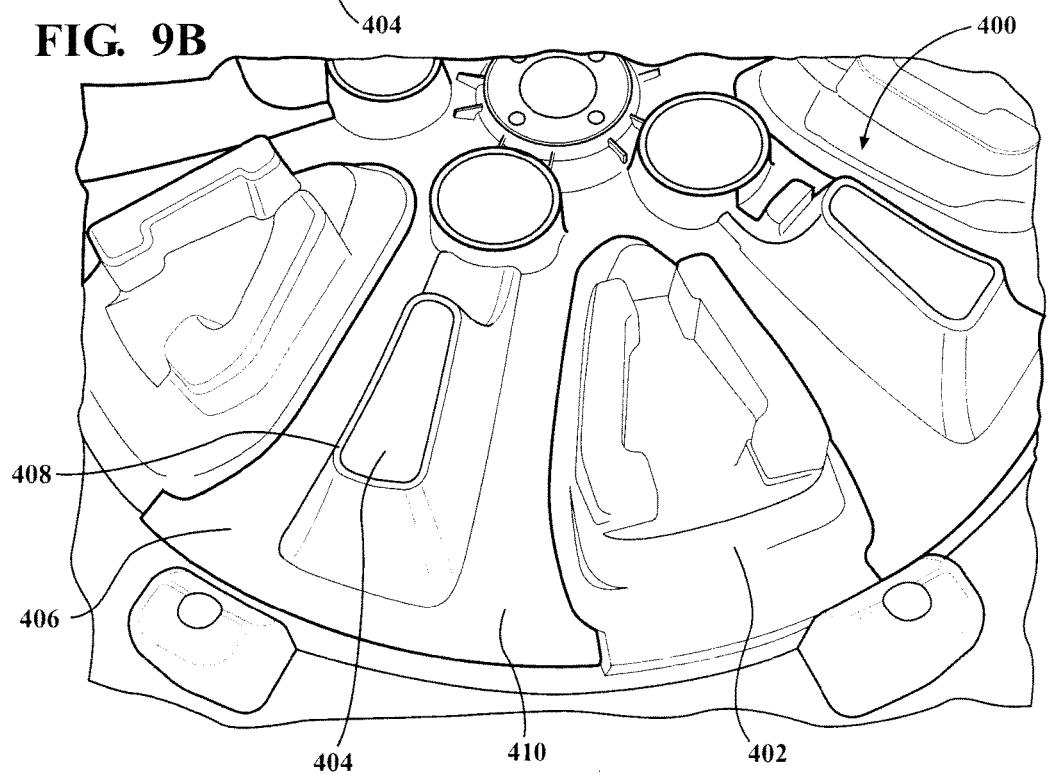
FIG. 9b is a schematic illustration of a cladding located on a wheel assembly pallet according to an aspect of the present disclosure.

As shown in FIG. 9b, according to an aspect, a cladding 410 can be placed face down on the pallet 400 such that the outboard face of the cladding rests on the upper surface of the pallet 400. According to an aspect, the wheel locating structures 402 can be disposed between adjacent spokes 406 of the cladding 410. According to another aspect, the clad locating structures 404 can engage a cladding spoke to window 408 to locate the cladding 410 with respect to the pallet 400. According to an aspect, the clad locating structures 404 may be generally wedge shaped. However, they could take on a variety of different shapes depending upon the configuration of the cladding 410. According to an aspect, the clad locating structures 404 can assist in centering and locating the cladding with respect to a reference datum. According to an aspect, one reference datum of concern is the rotational center of the wheel/cladding assembly. According to another aspect, the clad locating structures 404 can assist in centering (concentricity) the cladding 410 on the wheel 412 and assist in setting the angular orientation of the cladding 410 to the wheel 412.

Figure 9C:
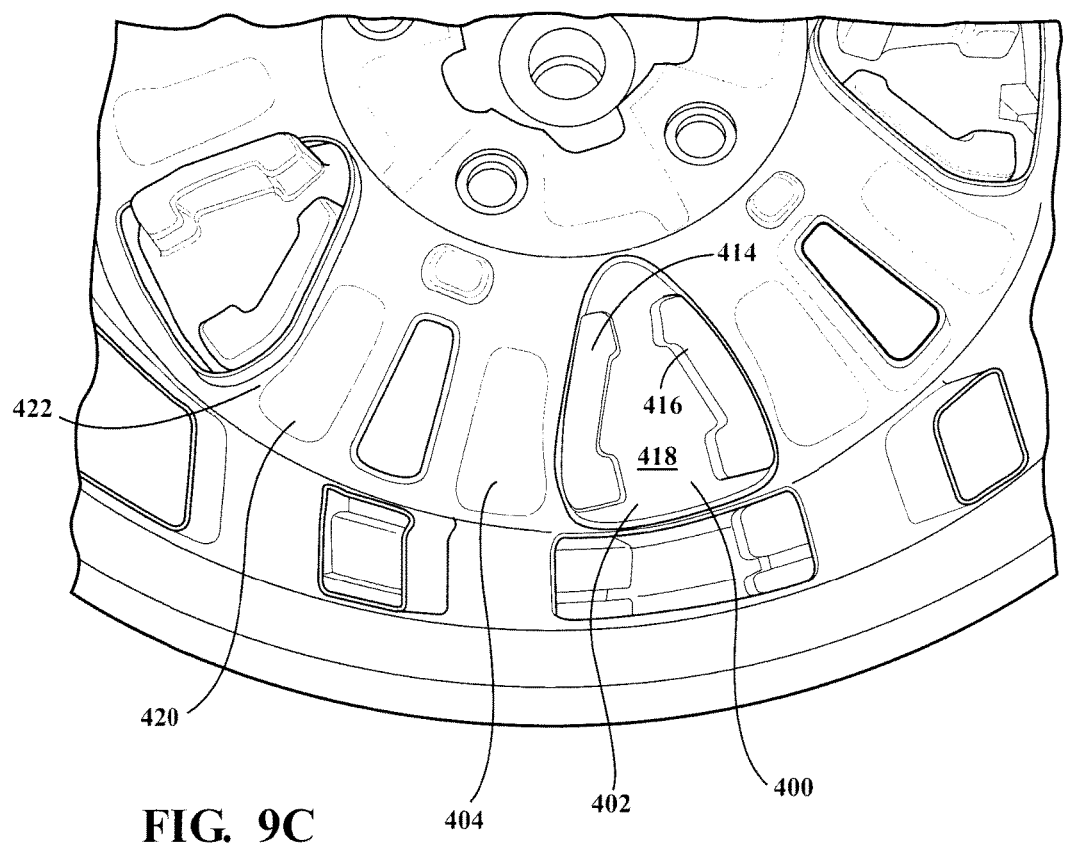
FIG. 9c is a schematic illustration of a wheel and a cladding located on a wheel assembly pallet according to an aspect of the present disclosure.
Figure 9D:
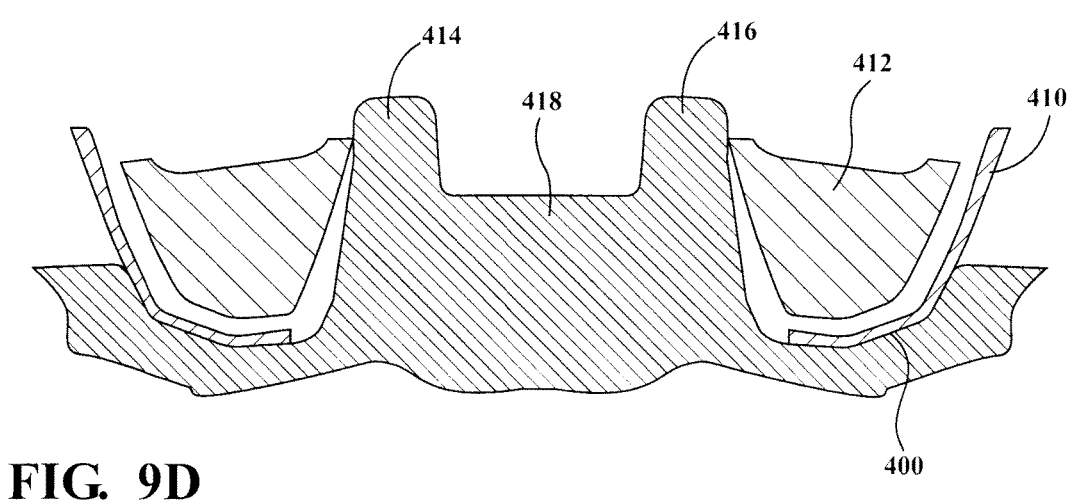
FIG. 9d is a cross-sectional view of a wheel and a cladding located on a wheel assembly pallet according to an aspect of the present disclosure.

FIGS. 9c and 9d illustrate a wheel 412 disposed face down on the cladding 410, which is disposed face down on the pallet 400. According to an aspect, the wheel locating structures 402 can include a first side portion 414, a second side portion 416, and a pocket portion 418 disposed therebetween. This arrangement of the side portions 414, 416 and the pocket portion 418 can allow flexibility in the wheel locating structures 402 whereby the side portions 414, 416 can move inwards into the pocket portion 418 as the wheel is placed on the pallet 400 to account for any tolerances that may exist in the wheel or cladding structures. The wheel locating structures can take on a variety of different configurations. According to an aspect, the side portions 414, 416 of the wheel locating structures 402 can be configured to contact or engage the wheel spoke 420 or wheel turbine opening 422 to locate the wheel properly on the pallet 400. The wheel 412 may then be positioned face down on the pallet 400. With this orientation, the wheel 412 may be placed face down such that the wheel outer surface contacts the cladding inner surface. According to an aspect, the wheel may engage the wheel locating features 402, as shown, to properly align the wheel 412 with respect to the cladding 410.

Figure 9E:
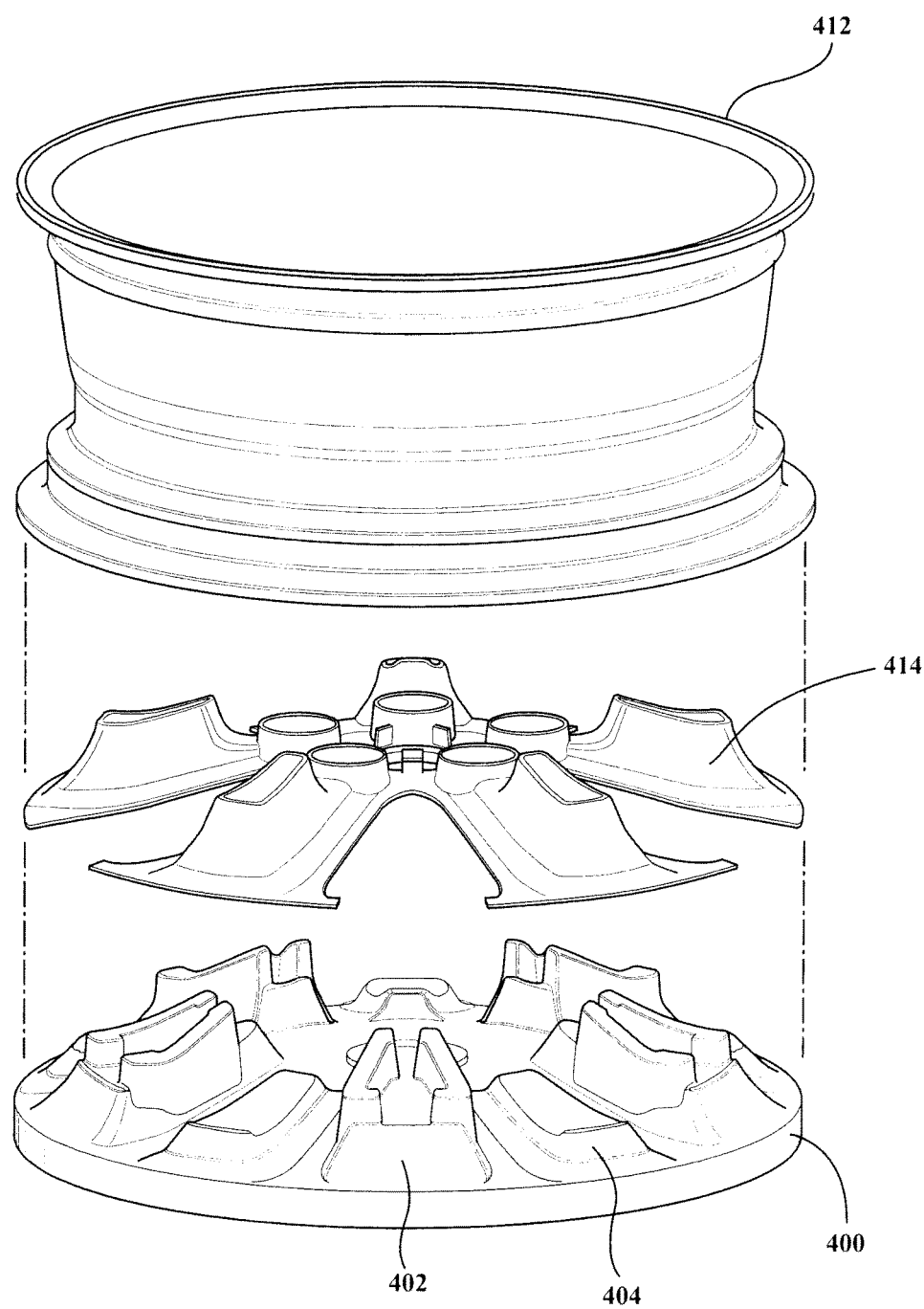
FIG. 9e is an exploded view of a wheel assembly pallet, cladding and wheel according to an aspect of the present disclosure.

FIG. 9e is an exploded view of the components of the wheel assembly and their assembly orientation in accordance with an aspect of the disclosure.

FIGS. 10a through 10e illustrate the features of the wheel assembly that can assist in isolating the wheel cladding from the wheel according to an aspect of the disclosure. The isolation of the clad from the wheel can prevent contact therebetween and serve to prevent corrosion and/or noise issues that can occur from abrasion due to any relative motion between the clad and the wheel.

Figure 10A:
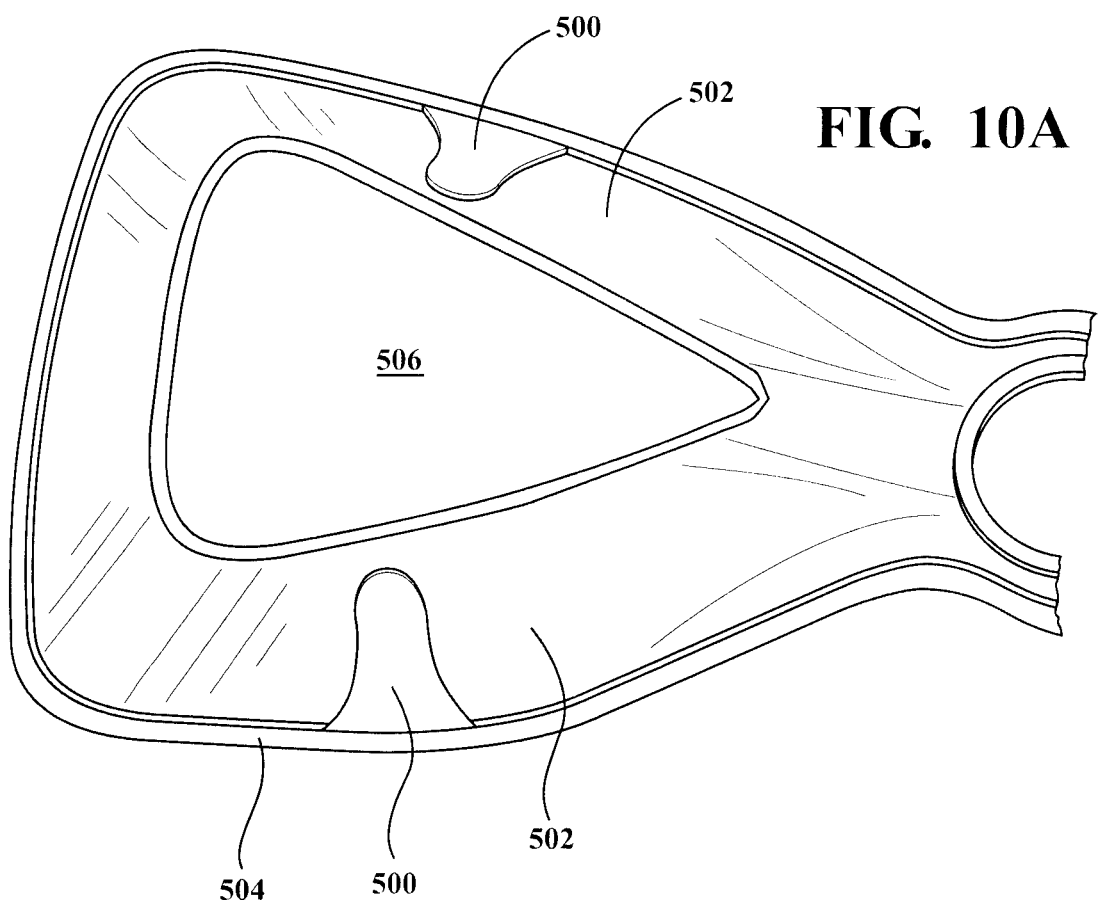
FIG. 10a is a schematic illustration of a cladding isolator feature according to an aspect of the present disclosure.

As shown in FIG. 10a, an isolator feature, such as a gimp or gasket 500 may be disposed between the wheel and the cladding. According to another aspect, the isolator feature 500 could be attached initially to either the cladding or the wheel. As exemplarily shown, the isolator feature 500 could be attached to the underside of a clad side spoke 502. According to an aspect, the isolator feature 500 may be generally cylindrical in shape and extend from an edge 504 of the clad side spoke 502 in a direction toward the clad turbine opening 506. As also shown, an isolator feature may be disposed on each clad side spoke 502. Obviously, more or less isolator features may be employed and they could be disposed in different places. Tape or other adhesive could then be utilized on the isolator features to assist in securing it to the other structure (wheel or cladding) to which the isolator feature is not attached. Alternatively, an adhesive that is separate from the isolator feature 500 could also be employed in other areas to secure the cladding to the wheel. The adhesive could be an RTV or foam adhesive. Alternatively, a double sided pressure sensitive adhesive could also be employed. Other suitable adhesives may also be employed. According to aspect, the isolator feature 500 can also assist in centering the cladding on the wheel as well as aligning the cladding to the wheel angularly. The disclosed feature can also help establish a gap distance between the cladding and the wheel to minimize contact therebetween.

Figure 10B:
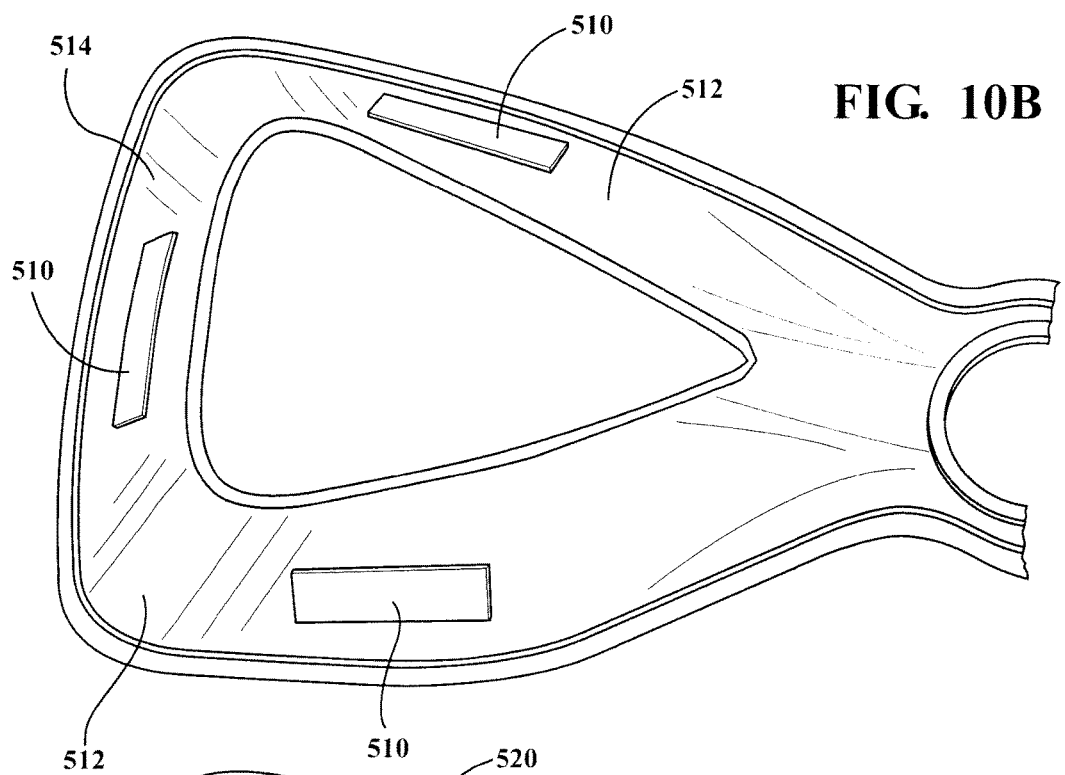
FIG. 10b is a schematic illustration of a cladding isolator feature according to another aspect of the present disclosure.

FIG. 10b illustrates another aspect of an isolator feature configured as a pad. According to an aspect, the pad 510 could be constructed of a UHMW polyethylene, plastic or foam. The pad could also be formed of other suitable materials. As shown, pads 510 could be disposed on each of the clad side spokes 512 as well as the clad rim portion 514. According to an aspect, the pads 510 could be disposed generally in the middle of the clad side spokes 512 and the clad rim portion 514. Obviously, more or less pads could be employed with the location of their placement also varying. It will be appreciated that the pad 510 could be constructed of other suitable shapes. According to an aspect, the pad 510 may be secured to the cladding (or wheel) with a tape or a pressure sensitive adhesive. The cladding can then be attached to the wheel using a separate adhesive. According to an aspect, the isolator feature 510 can help center the cladding on the wheel as well as align the cladding to the wheel angularly. The isolator feature 510 can also establish a gap/distance between the cladding and the wheel to minimize contact therebetween.

Figure 10C:
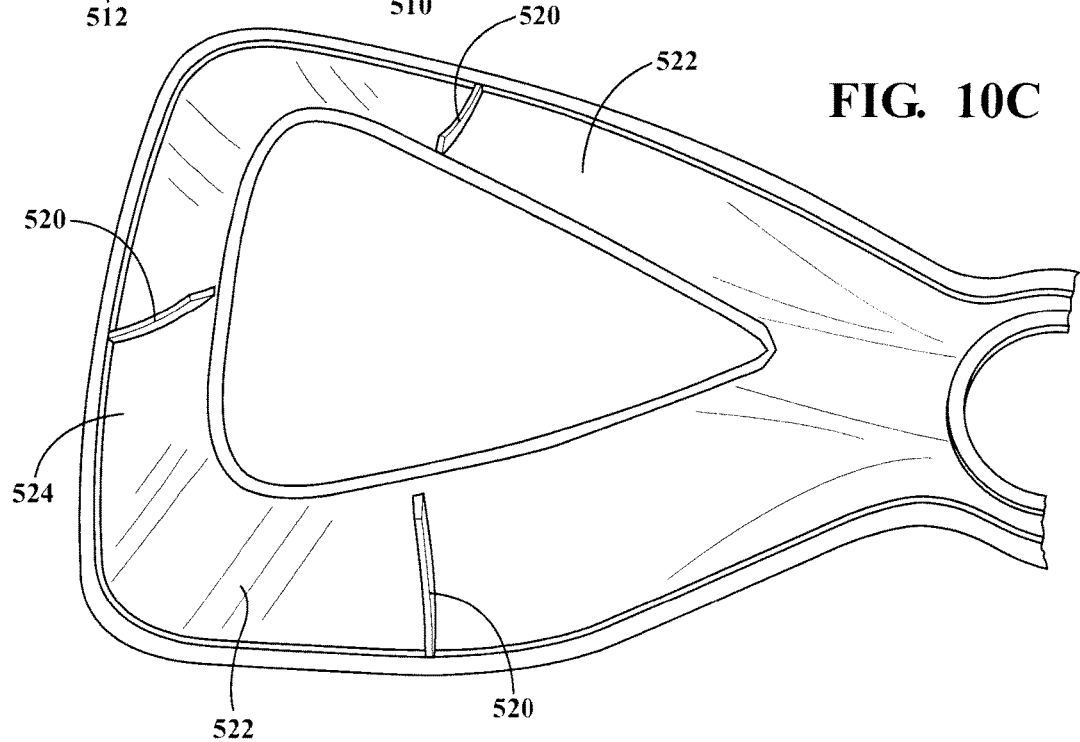
FIG. 10c is a schematic illustration of a cladding isolator feature according to still another aspect of the present disclosure.

FIG. 10c illustrates still another aspect of the disclosure where the isolator feature consists of a plurality of standoff ribs 520. As shown, the plurality of standoff ribs 520 may be disposed on each of the cladding side spokes 522 and the cladding rim portion 524. The standoff ribs 520 can be molded into the cladding. According to an aspect, the ribs can allow the cladding to be attached to the wheel using adhesive over the ribs 520 so as to isolate the cladding from any clear coat on the wheel, which can minimize any corrosion. It will be appreciated that the number of ribs employed may vary as can their location on the cladding. It will also be appreciated that the ribs can be formed on the cladding (or wheel) in a variety of different ways. According to an aspect, the standoff ribs 520 can help center the cladding on the wheel and assist in aligning the cladding to the wheel angularly. The standoff ribs 520 can also establish a gap/distance between the cladding and the wheel. The ribs 520 may have a variety of other suitable configurations.

Figure 10D:
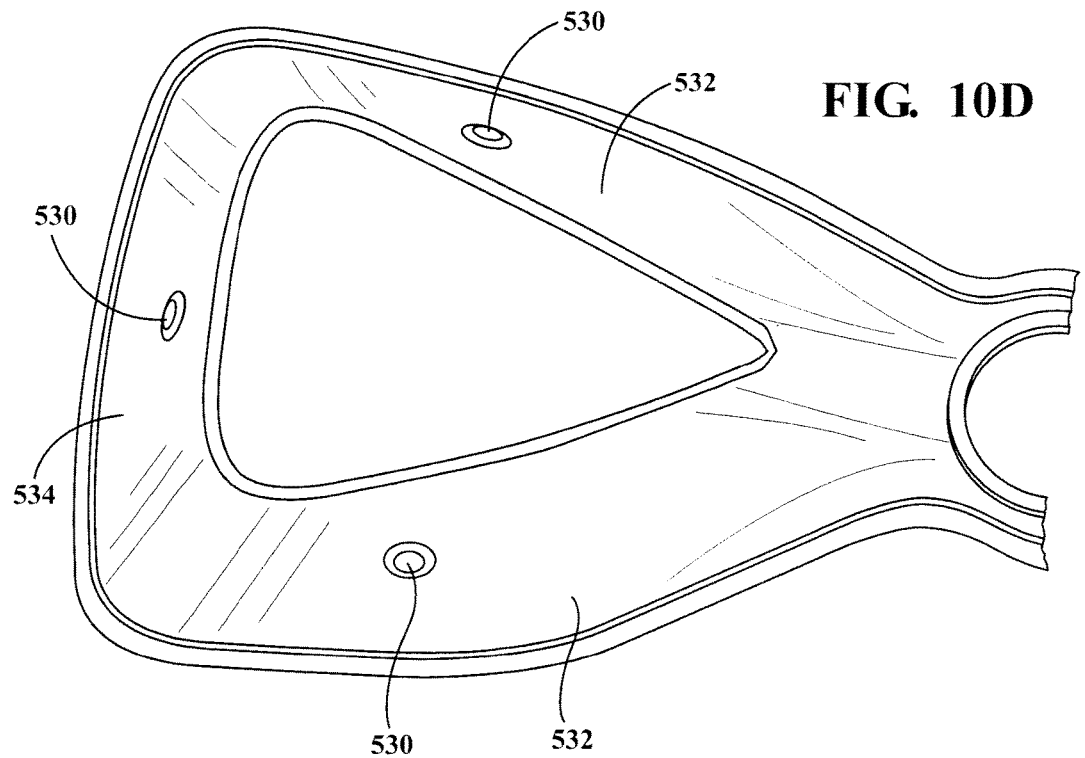
FIG. 10d is a schematic illustration of a cladding isolator feature according to a further aspect of the present disclosure.

FIG. 10d illustrates yet another aspect of the disclosure where the isolator feature consists of a plurality of stand-off dimples 530. As shown, the plurality of stand-off dimples 530 may be molded or formed into the cladding (or wheel). According to this aspect, after the cladding is formed, an adhesive can be disposed over the dimples 530 and then the cladding can be attached to the wheel. It will be appreciated that the dimples 530 could be formed in a variety of other suitable ways. As shown, the plurality of dimples 530 may be disposed on each of the cladding side spokes 532 and the cladding rim portion 534. According to an aspect, the adhesive over the dimples can serve to isolate the cladding from the clear coat on the wheel. It will be appreciated that the number of dimples employed may vary as can their location on the cladding. According to an aspect, the dimples 530 can help center the cladding on the wheel and assist in aligning the cladding to the wheel angularly. The dimples 530 can also establish a gap/distance between the cladding and the wheel to minimize or prevent contact therebetween.

Figure 10E:
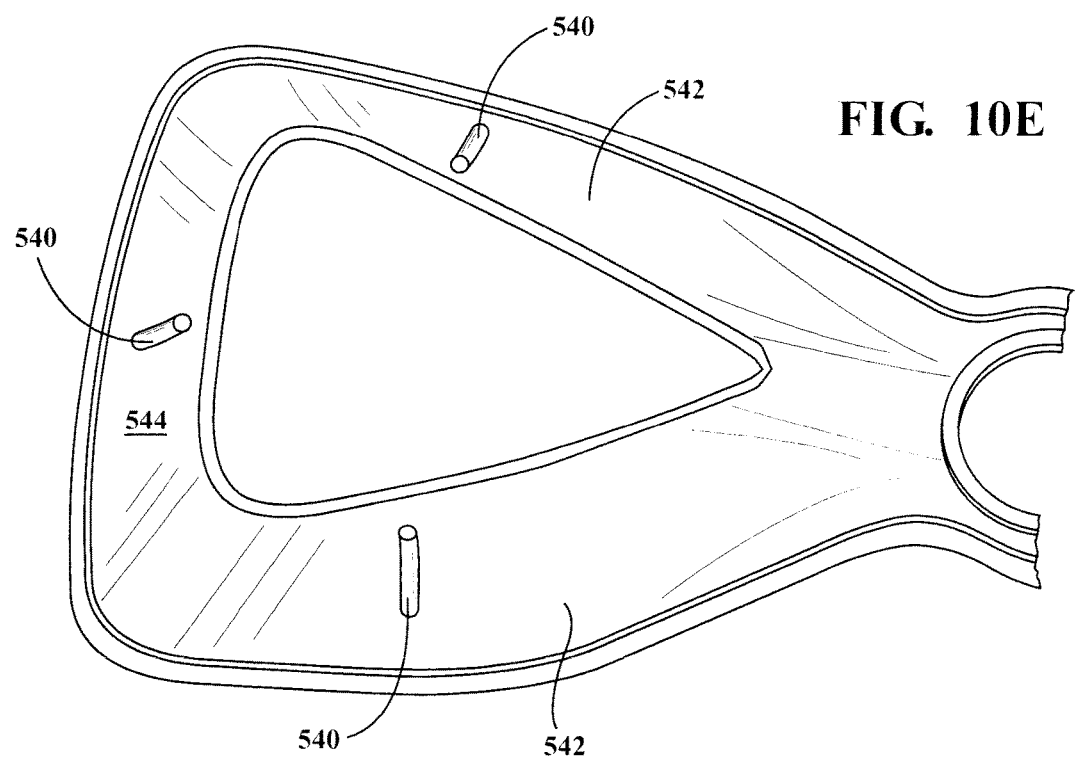
FIG. 10e is a schematic illustration of a cladding isolator feature according to yet another aspect of the present disclosure.

FIG. 10e illustrates a further aspect of the disclosure where the isolator feature consists of a pre-cured elastomeric adhesive 540 attached to the cladding or the wheel. As shown, the pre-cured elastomeric adhesive 540 may be disposed on each of the cladding side spokes 542 and the cladding rim portion 544. The location of the isolator feature can obviously vary. Additionally, more or less isolator features may be employed. According to an aspect, once the pre-cured elastomeric adhesive 540 is attached, a separate adhesive may then be used to adhere the cladding to the wheel. According to an aspect, the pre-cured elastomeric adhesive 540 can help center the cladding on the wheel and assist in aligning the cladding to the wheel angularly. The pre-cured elastomeric adhesive 540 can also establish a gap/distance between the cladding and the wheel.

The above described isolators are merely exemplary and a variety of other ways of isolating the cladding from the wheel may be employed. Additionally, the isolators could be used in combination as desired.

In accordance with an aspect, an assembly process for securing the cladding to the wheel is also provided. According to the method, the assembly process and fixturing is unique. The key features relate to centering of the clad to the backbone wheel features as well as mechanisms to set a consistent gap from wheel to cladding, accounting for wheel and/or cladding surface geometry variations, while maintaining the ability to isolate the wheel from the clad to prevent corrosion and potential noise issues during on-vehicle operation. This can also address some of the packaging issues related to the utilization of claddings in small spaces available on passenger car wheels.

Figure 11A:
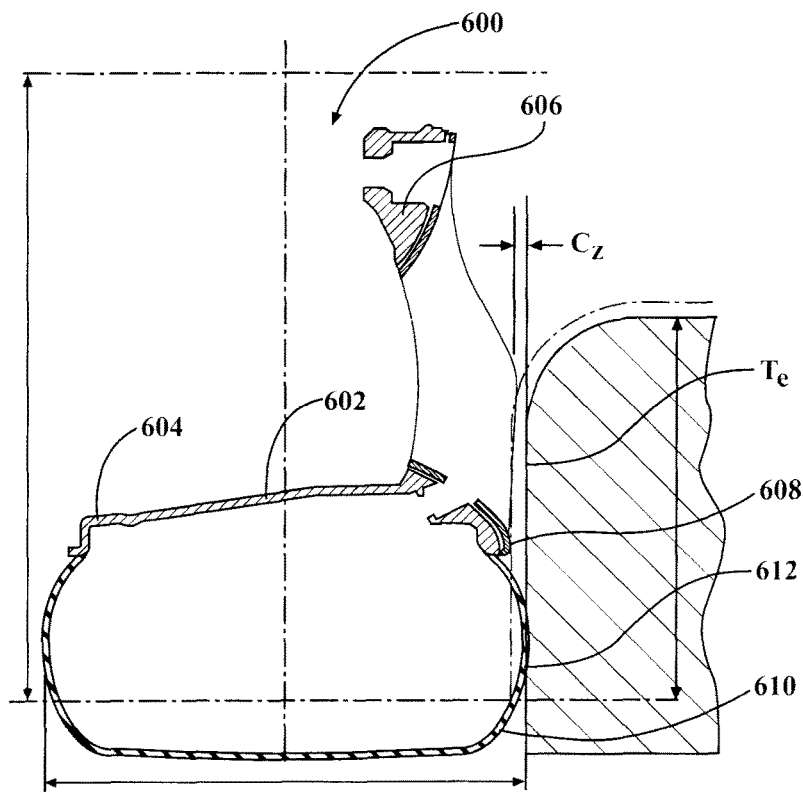
FIG. 11a is a schematic illustration of a prior art wheel assembly.

FIG. 11a illustrates a wheel assembly attached to a vehicle. As shown, the wheel assembly 600 includes a wheel 602 having a rim portion 604 and an outboard face 606. As also shown, a cover or cladding 608 is attached to the outboard face 606 of the wheel 602. A tire 610 is disposed on the rim portion 604 of the wheel 602. The outboard edge 612 of the tire defines an envelope (Te) or profile of the tire. As shown, inwardly of the envelope (Te) is a known clearance zone (Cz) that can be intruded upon by structures exterior to the vehicle. The wheel cannot intrude into the clearance zone or it will be unacceptable for OEM use. However, as illustrated in FIG. 11a, depending upon the size of the vehicle, the prior art cladding 608 can extend into the clearance zone (Cz), which is disadvantageous. This is due, in large part, to the fact that the cladding 608 covers all exterior surfaces of the wheel outboard face 606.

Figure 11B:
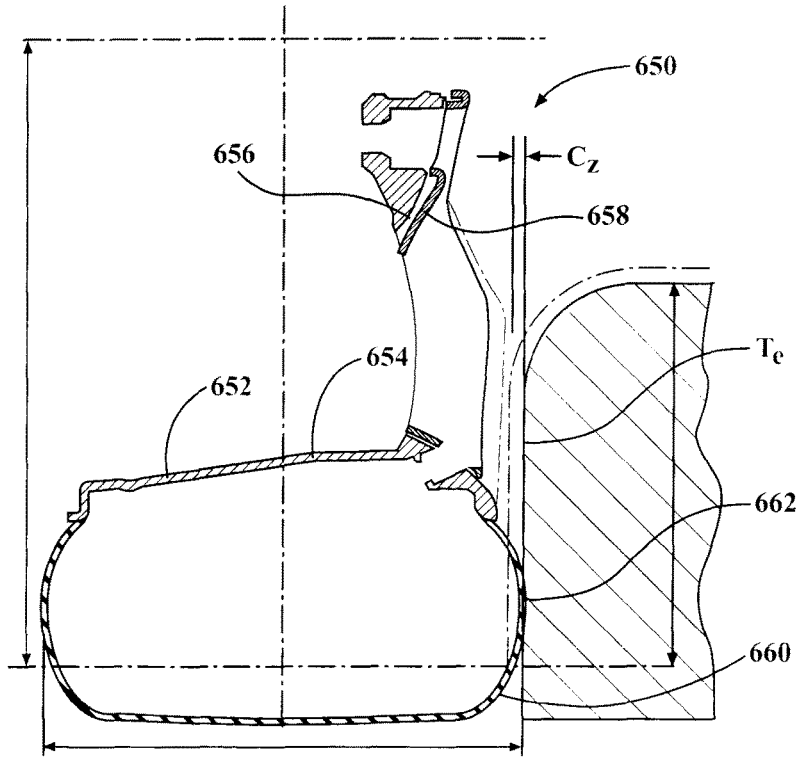
FIG. 11b is a schematic illustration of a wheel assembly in accordance with an aspect of the present disclosure.

FIG. 11b illustrates a wheel assembly attached to a vehicle according to an aspect of the disclosure. As shown, the wheel assembly 650 includes a wheel 652 having a rim portion 654 and an outboard face 656. As also shown, a cover or cladding 658 is attached to the outboard face 656 of the wheel 652. A tire 660 is disposed on the rim portion 654 of the wheel 652. The outboard edge 662 of the tire defines an envelope (Te) or profile of the tire. As shown, a clearance zone (Cz) is again defined inwardly of the envelope (Te). As shown, the cladding 658 in accordance with an aspect of the present disclosure does not extend into the clearance zone (Cz). As such, there is no interference between the cladding 658 and the clearance zone (Cz). According to an aspect, the cladding 654 can rest or nest within the wheel turbine openings such that their outer surface does not intrude into the clearance zone (Cz). The cladding 654 can thus provide desired aesthetics with a smaller profile, which can be desirable for small vehicles. A cladding with this configuration can also provide aerodynamic benefits.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A wheel assembly, comprising:
   a wheel portion including:
   a wheel central hub portion;
   a wheel outer periphery;
   a plurality of wheel spoke portions extending generally between the wheel central hub portion and the wheel outer periphery;
   a plurality of wheel turbine openings, each of said wheel turbine openings defined generally by adjacent wheel spoke portions, the wheel outer periphery and the wheel central hub portion;
   the wheel central hub portion, the plurality of wheel spoke portions and the wheel outer periphery generally defining a wheel outboard surface; and
   a plurality of individual cladding portions separately disposed on and permanently secured via an adhesive to the wheel outboard surface, said plurality of cladding portions at least partially disposed on the plurality of wheel spoke portions.

2. The assembly of claim 1, wherein the plurality of cladding portions extend generally between the wheel central hub portion and the wheel outer periphery.

3. The assembly of claim 1, wherein the plurality of cladding portions are disposed on each of the plurality of wheel spoke portions.

4. The assembly of claim 1, wherein at least a portion of the outboard surface of the plurality of wheel spoke portions remains exposed adjacent the plurality of cladding portions.

5. The assembly of claim 1, wherein the plurality of cladding portions include a plurality of cladding turbine opening portions separately disposed on and permanently secured to a plurality of surfaces which define the plurality of wheel turbine openings.

6. The assembly of claim 5, wherein the plurality of cladding turbine opening portions are annular such that they surround each of the wheel turbine openings.

7. The assembly of claim 6, wherein the cladding turbine opening portions are nested within the plurality of wheel turbine openings such that an underside of each of the plurality of cladding turbine opening portions overlie an outboard surface of the plurality of wheel turbine openings.

8. The assembly of claim 1, wherein the plurality of cladding portions include a plurality of clad spoke portions separately disposed on and permanently secured only to the plurality of wheel spoke portions.

9. The assembly of claim 8, wherein the wheel spoke portions include recesses and the plurality of clad spoke portions are disposed in the recesses.

10. A wheel assembly, comprising:
    a wheel portion including:
    a wheel central hub portion;
    a plurality of wheel spoke portions extending generally outwardly from the wheel central hub portion, the plurality of wheel spoke portions having inner ends adjacent the wheel central hub portion, outer ends disposed outwardly from the inner ends, and side surfaces extending generally between the inner and outer ends;
    a plurality of wheel turbine openings located generally between adjacent ones of the plurality of wheel spoke portions;
    a wheel outer periphery adjacent the outer ends of the plurality of wheel spoke portions;
    the wheel central hub portion, the plurality of wheel spoke portions and the wheel outer periphery generally defining a wheel outboard surface;
    a plurality of separate claddings detached from one another, each of said claddings having an inboard surface configured to overlie at least a portion of the wheel outboard surface; and
    an adhesive for permanently securing the inboard surfaces of the plurality of claddings to the wheel outboard surface.

11. The assembly of claim 10, wherein the plurality of claddings are nested with the wheel turbine openings such that they completely overlie the side surfaces of the wheel spoke portions.

12. The assembly of claim 11, wherein each of the plurality of claddings has an annular outer periphery such that they entirely surround each of the wheel turbine openings.

13. The assembly of claim 10, wherein the plurality of claddings are disposed at least partially on the plurality of wheel spoke portions such that they extend substantially from the wheel central hub portion to the wheel outer periphery.

14. The wheel assembly of claim 10, wherein the plurality of claddings are disposed on the wheel outboard surface such that they contact at least a portion of the wheel spoke portions and surround a perimeter of the plurality of wheel spoke portions.

15. The wheel assembly of claim 10, wherein the plurality of claddings are entirely disposed on the wheel spoke portions.

16. The wheel assembly of claim 15, wherein the plurality of claddings are disposed in recesses formed in the wheel outboard surface in the wheel spoke portions.

17. The wheel assembly of claim 15, wherein the plurality of claddings are disposed on each of the plurality of wheel spoke portions.

18. The assembly of claim 10, wherein at least a portion of the wheel central hub portion is exposed after the plurality of claddings are secured to the wheel outboard surface.

19. The assembly of claim 10, wherein a portion of each of the plurality of wheel spoke portions remains exposed after the plurality of claddings are secured to the wheel outboard surface.

20. A wheel assembly, comprising:
a wheel portion including:
a wheel central hub portion;
a wheel outer periphery;
a plurality of wheel spoke portions extending generally between the wheel central hub portion and the wheel outer periphery;
a plurality of wheel turbine openings, each of said wheel turbine openings being generally bounded by adjacent wheel spoke portions, the wheel central hub portion, and the wheel outer periphery; and
a plurality of separate claddings detached from one another, each of said claddings being permanently secured at least partially along one of the plurality of wheel spokes.

21. The assembly of claim 20, wherein the plurality of claddings are disposed such that they border a perimeter of the plurality of wheel turbine openings.

22. The assembly of claim 21, further comprising:
a second set of separate claddings that are disposed and permanently secured to the plurality of the wheel spokes generally along a middle portion thereof.

23. The assembly of claim 20, wherein the plurality of claddings at least partially overlie side surfaces of the plurality of wheel spoke portions.

24. The assembly of claim 20, wherein each of the plurality of claddings has an annular outer periphery.

25. The assembly of claim 24, wherein each of said claddings is permanently secured about the entirety of separate ones of the plurality of wheel turbine openings.

* * * * *